Clarence W. Brandon
INVENTOR.

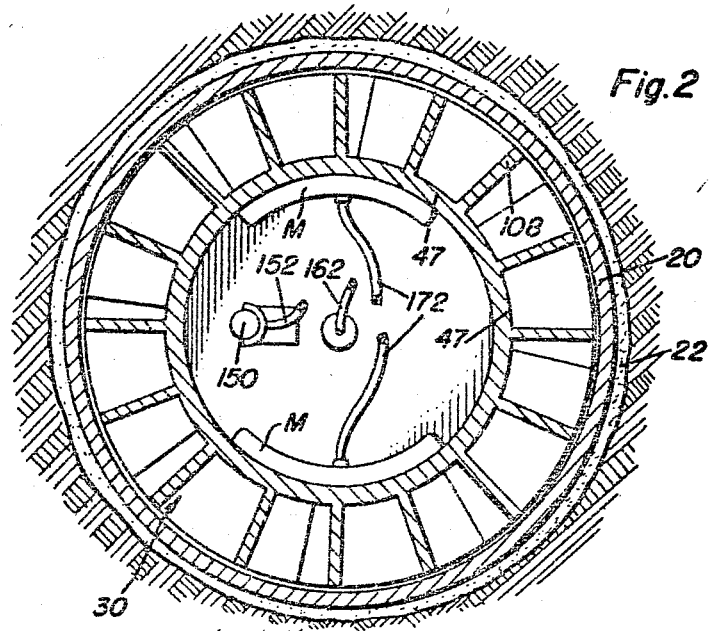
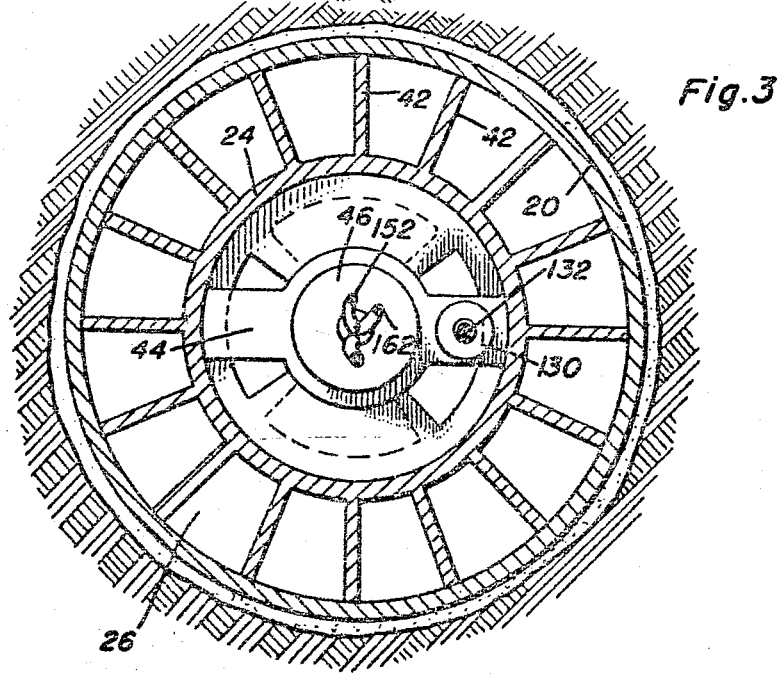

Clarence W. Brandon
INVENTOR.

BY Head & Johnson

ATTORNEYS

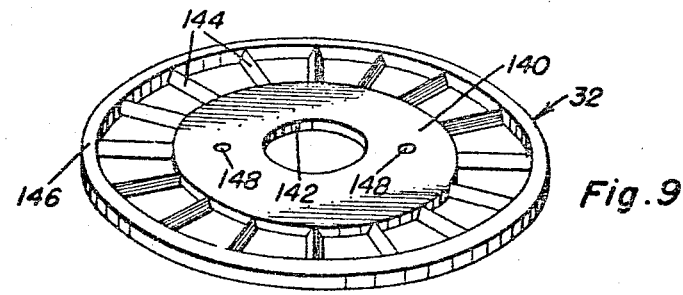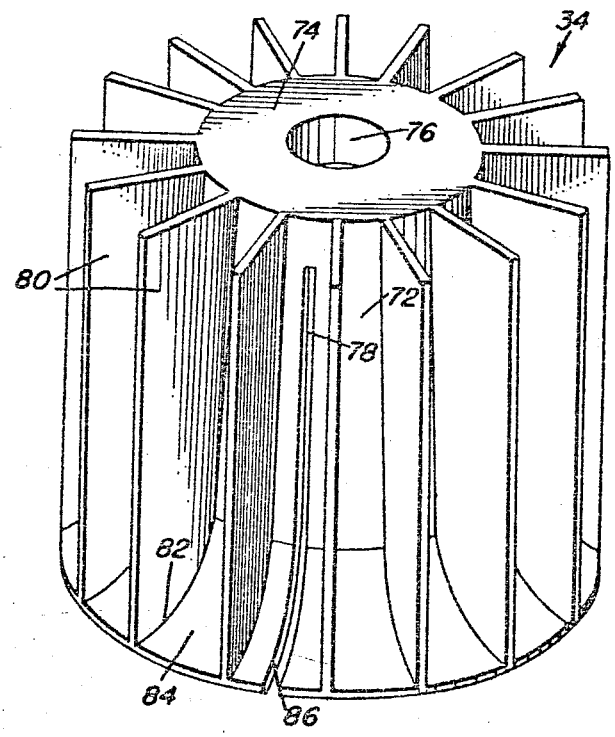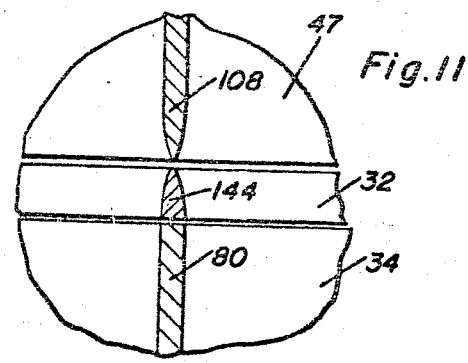

Clarence W. Brandon
INVENTOR.

BY Head & Johnson
ATTORNEYS

Clarence W. Brandon
INVENTOR.

BY Head & Johnson

ATTORNEYS

Clarence W. Brandon
INVENTOR.

BY Head & Johnson

ATTORNEYS

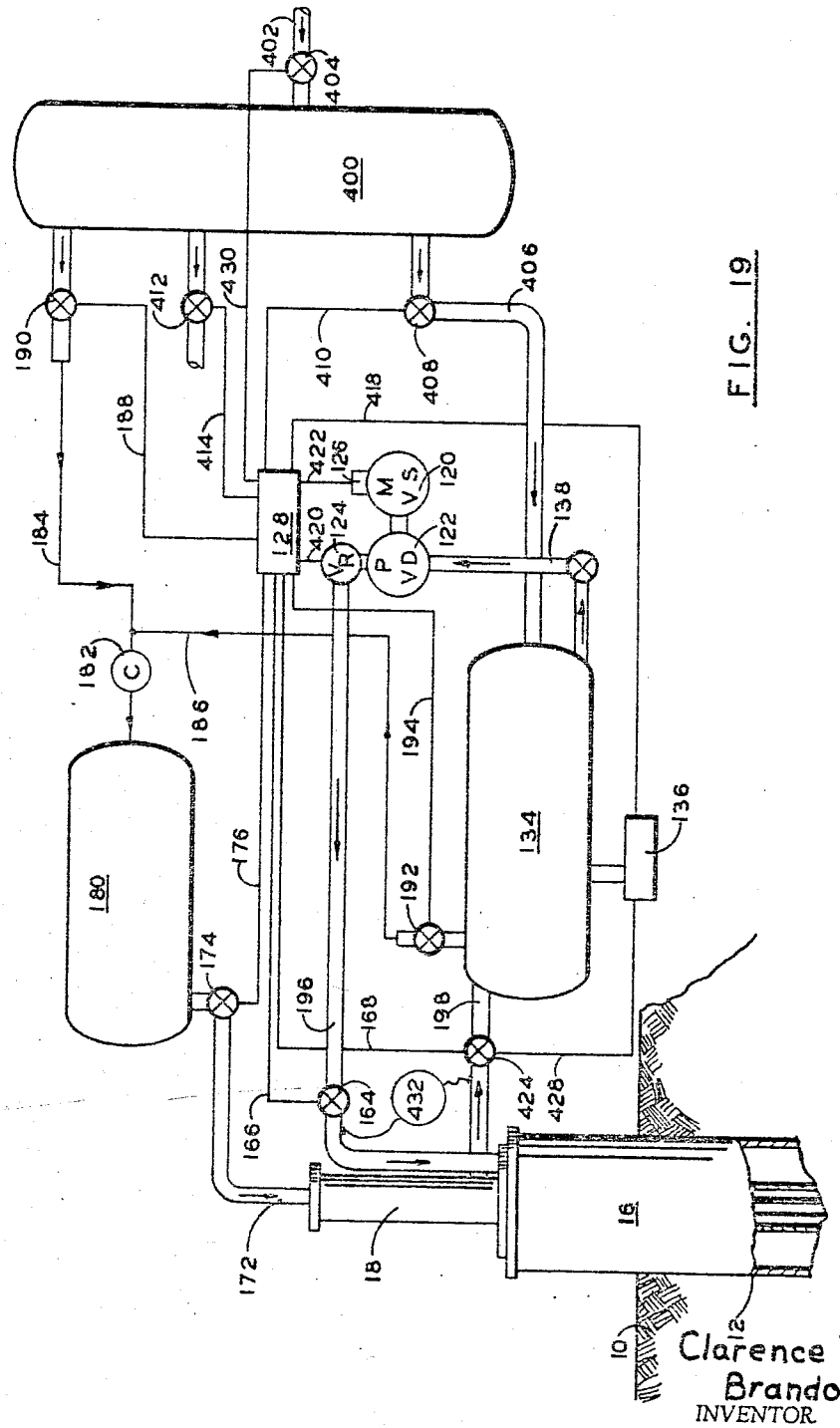

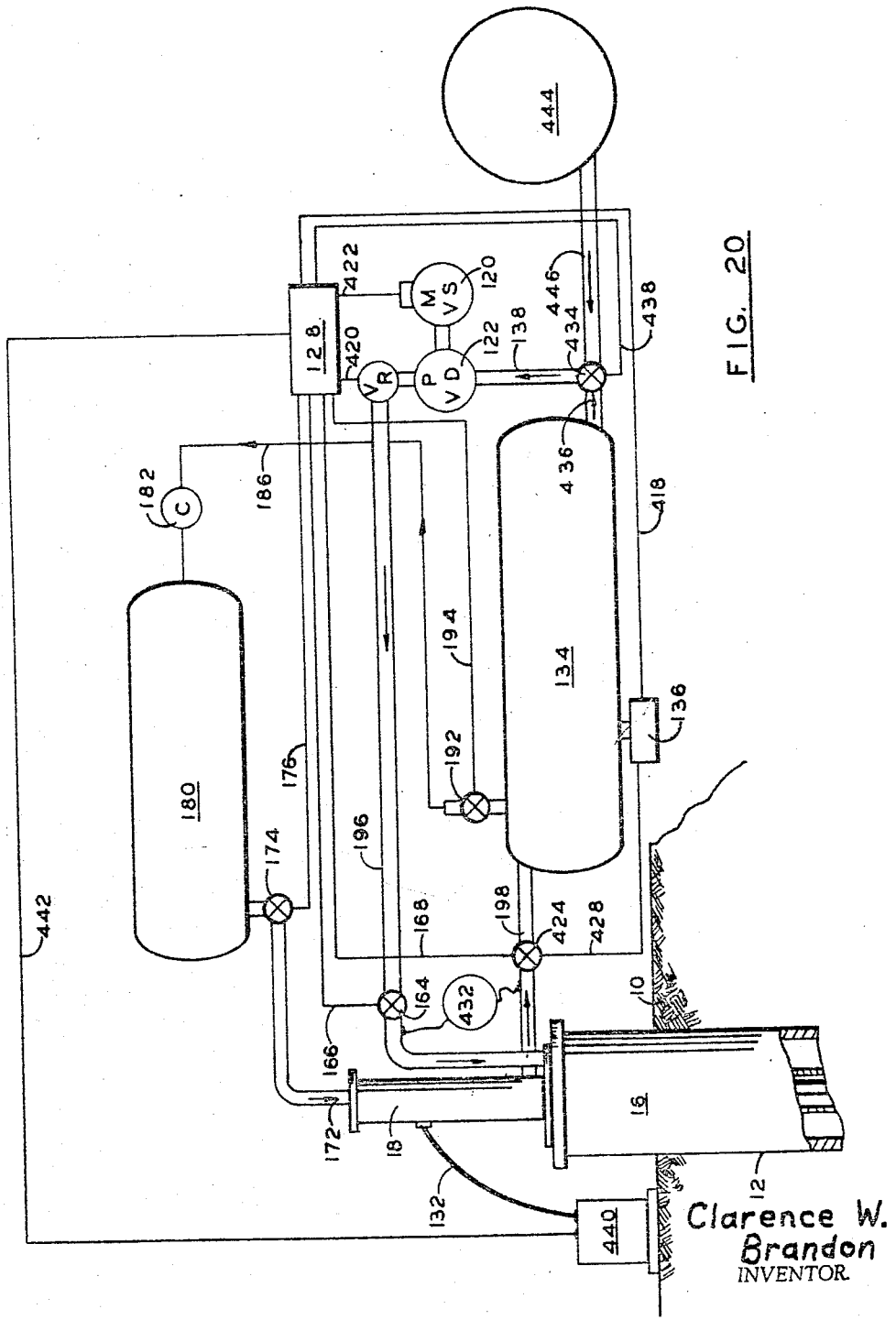

United States Patent Office 3,422,894
Patented Jan. 21, 1969

3,422,894
METHOD OF TREATING AND PRODUCING FLUIDS FROM RESERVOIRS OF VARIABLE PERMEABILITY
Clarence W. Brandon, Tulsa, Okla., assignor of twelve and one-half percent to Orpha B. Brandon, Tulsa, Okla., five percent to Harvey B. Jacobson, Washington, D.C., and fifty percent to N. A. Hardin, Catherine H. Newton and Hazel H. Wright, all of Forsyth, Ga., jointly
Continuation-in-part of application Ser. No. 211,778, July 23, 1962. This application June 5, 1967, Ser. No. 643,609
U.S. Cl. 166—42        41 Claims
Int. Cl. E21b *43/26, 43/25, 43/16*

ABSTRACT OF THE DISCLOSURE

An oil recovery method wherein cyclic alternations of fluid medium and sonic waves are introduced into a variably permeable formation and are controlled such that fluid medium and sonic waves are withdrawn cyclically during the rarefaction portion of the alternation waves. This causes greater production from the less permeable areas.

---

This application is a continuation-in-part of my copending application Ser. No. 211,778, filed July 23, 1962, now Patent No. 3,323,592, which was a continuation-in-part of application Ser. No. 433,965, filed June 2, 1954, now Patent No. 3,045,749, and contains subject matter common to my copending application Ser. No. 611,082, filed Jan. 23, 1967, which is a continuation-in-part of application Ser. No. 665,995, filed June 17, 1957, now Patent No. 3,302,720.

This invention pertains to improved methods for the use of fluids and sonic waves of particular characteristics in the various methods of treating of, secondary recovery by, and the production from reservoirs of variable permeability and/or porosity containing oil, gas and other fluids, particularly those formations of extreme variation of permeability of the face of the formation exposed to the well bore, wherein various treating methods have had the adverse effect of increasing the permeability of sections already too permeable in relation to the rest of the formation, and wherein it has been economically ineffectual to use secondary recovery waterflooding, miscible or immiscible gas driving, or any of the other methods of recovery dependent upon a substantially uniform bank of production fluids being maintained in and advanced to production wells within the reservoirs.

One of the major causes of present uneconomical recovery of several billions of barrels of oil from certain known reserves wherein well bores have more than amply outlined the limits of production, as well as provided an access means for what would be considered to cause substantial complete drainage of oil and gas from the field, is that these are stratified formations, which, under changing conditions of geological time cause variations in permeability to the flow of petroleum and other interstitial fluids and capacity of the pore space to accumulate these various fluids. This variation may be several thousand percent within a few feet of the vertical height of a stratified productive formation.

These variations inhibit the ability of a formation to produce a uniform rate of fluid production and effectively drain these types of reservoirs. This inhibition is similar to that contained within an impermeable formation that prevents escape or migration of the petroleum and other fluids from a particular reservoir.

By way of illustration, in one reservoir in south Texas, the original petroleum in place was estimated by reliable authorities to be in excess of 150 million barrels of oil. The total primary production from all of the uniformly patterned wells drilled into the reservoir was less than 40 million barrels of oil. It was estimated by known factors that because of the high residual oil saturation of the sand of the reservoir, that secondary recovery waterflooding of this enclosed reservoir should produce an amount of oil approximately equaling the primary production, or an additional 40 million barrels of oil.

Subsequent secondary recovery waterflooding by carefully engineered methods was continued in one section of the reservoir until non-economic production was approached. At that time, less than ten percent of the estimated secondary recovery production was obtained. Later analysis revealed that the sand had an extremely variable profile of permeability throughout the thickness of the sand. This variable vertical permeability of the sand ran from a few millidarcys up to several thousand millidarcys. Injected flood water would by-pass the main sections of the sand and quickly go to the production wells through these more open sand sections. Accordingly, only a fraction of the oil left in place was caused to be produced. Once water production at each of the production wells approached the capacity of the pumps, substantially no more oil would be produced from that weil and all of that area of the reservoir between the nearest water injection weil and that production well would be considered depleted of recoverable oil.

Numerous corrective measures were not successful in attempting to correct this by-passing by the flood water through these more permeable sections of the sand. Various types of substances and viscous fluids were forced into these more permeable strata. The flood water would go through the less permeable areas of sand that were not blocked by the permeability decreasing agents, but as soon as the relatively superficial extent of the formation blocked by the agents was passed, then the flood water would again enter the more permeable strata and thus by-pass the main oil saturated sections of the sand.

It can be seen from the above example that some other approach must be conceived in order to successfully recover oil from these numerous reservoirs of variable permeability that have a substantial percentage of the original residual oil remaining therein after production wells have depleted economic recovery of oil from primary oil production.

I have shown and described in detail in my copending applications, Ser. No. 433,965, Ser. No. 665,995, and Ser. No. 611,082, and other continuing or related applications, methods and apparatus capable of recovering substantial amounts of this normally unrecoverable oil. Basically these inventions teach use of a fluid medium through which particular and peculiar sonic waves having controlled and repetitious forms of modulated sonic energy are transmitted. This effect can be entirely automatic or semi-automatic with manual changes being made at various periods of time in accordance with visual and/or recorded results.

Accordingly, one of the principal objects of this invention is to provide a method of substantially controlling the area and extent of secondary recovery drive fluids in productive reservoirs of variable permeability and/or porosity, so that increased total production of fluids may be obtained from the reservoir.

The foregoing objective is achieved by regulating the simultaneous injection of fluids and sonic or pulsating pressure waves and the cyclic withdrawal thereof, whereby the variable permeable and porous sections of the strata will have a more uniform advance of the injected fluids and sonic energy throughout the vertical height of the productive sand.

In accordance with the present invention, well fluid is contacted by a sonic wave radiating means placed near the face of the formation which means is constructed to cyclically al'ow half wave pressure inpulses from a sonic generator to be connected directly with the fluids of the formation during the compression half wave cycle of the produced sonic wave and controllably release said sonic pressure impulses from the formation during the half wave rarefaction portions of the sonic impulses from said sonic wave generator.

Application of the pulsating sonic pressure to the fluid drive and to the formation may be effected through a rotating pressure applying and releasing member, whereby a circular zone of the formation shall be treated in order to produce a spiraling peaked pressure half wave and controlled rarefied half wave within the formation.

A further principal and important object of this invention is to provide a process for treating fluid reservoirs of variable permeability and porosity for increase of production therefrom, whereby strata of less permeability and porosity may be controllably and selectively treated with fluids concurrently in an open well bore along with the more permeable and porous strata.

Another object in conjunction with the preceding object is to provide a method whereby strata of less permeability and porosity may be selectively and controllably fractured and/or acidized to a greater extent and area in reservoirs wherein strata of less and more permeability and porosity have open access to the well bore.

In conjunction with the two preceding objects, when pressures build up at injection wells used for secondary recovery, or substantial portions of the less permeable portions of the productive formation are being by-passed, as indicated by takeover of production wells by drive fluids, then controllably these less permeable sections of the strata may be fractured more fully and completely than the more permeable portions of the strata, so that control of the driving of the interstitial fluids of the formation may be accomplished from these less permeable portions of the formation by the drive fluids being injected in the formation at the injection wells.

Also, various gases may be introduced into the formation along with other fluids. whereby liquefiable gases such as petroleum gases or other volatile gas such as carbon dioxide or nitrogen may be used to form a substantially one phase fluid with the injected fluid or interstitial fluids of the formation under peak injection pressures and upon rarefaction releases of controllable pressures, either within the formation or at the face of the formation in the well bore, will allow controllable fracture of or retention of drive pressures within the less permeable strata of the formation while substantially controlling the fracture of or driving of interstitial fluids from the more permeable portions of the formation, by forming two phases of fluids in the more permeable portions of the strata, thereby controlling drive pressure buildups or limiting pressures below formation fracturing pressures within these more permeable strata of the formation.

A still further object and purpose is to provide a process whereby a fluid medium and sonic wave pressure may be alternately applied to and removed and released from a formation progressively along a circular path whereby controlled and selected frequencies and peaked amplitudes of fluid pressure and sonic wave pulsations are applied to and released from the formation; and where additional series of sonic wave pulsations of different frequencies and intensities may be applied to the fluid medium and to the sonic waves.

Toward this end, rotation of a fluid and sonic wave distributor by a fluid medium is effected and to directly apply the fluid and sonic waves by the distributor to a formation from portions of the distributor and to selectively and controllably as to timed frequencies and amplitudes withdraw and release the applied fluid and sonic wave energy from the formation through other portions of the distributor.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

FIGURE 1 is a view in vertical central section through a preferred form of apparatus in accordance with this invention, certain concealed parts being indicated in dotted lines therein; the section being taken through the apparatus in a plane to illustrate the passage of the return flow of pressure fluid and sonic waves which has been previously applied to a formation and is returning therefrom through the apparatus.

FIGURE 2 is a horizontal sectional view taken substantially upon the plane indicated by the section line 2—2 of FIGURE 1 and showing in particular the internal construction of the turbine rotor and sonic generator forming a distributor of the pressure fluid and sonic energy in accordance with this invention.

FIGURE 3 is a horizontal sectional view taken substantially upon the plane indicated by the section line 3—3 of FIGURE 1 and showing in particular the stationary turbine diffuser blade assembly for directing the pressure fluid from the turbine rotor of the device into the formation.

FIGURES 6–10 are perspective views showing in their relative positions the various essential elements of this apparatus, and wherein;

FIGURE 6 is a perspective view, the top portion of the same being shown in horizontal section, of the stationary diffuser vane assembly of the apparatus for directing the fluid pressure medium into the turbine rotor and sonic wave radiator and distributor;

FIGURE 7 is a perspective view of a control valve for producing shock waves or hammer waves in the fluid pressure and sonic wave conducting medium;

FIGURE 8 is a perspective view of the turbine rotor forming both a rotating sonic wave generator and a distributing means for the sonic wave and pulsating fluid pressure;

FIGURE 9 is a perspective view of a high frequency wave generating means forming an element of the invention;

FIGURE 10 is a perspective view of the stationary pressure fluid distributor vane and sonic wave radiating assembly for directing fluid and sonic waves from the turbine rotor and sonic wave generator and distributor into the formation.

FIGURE 11 is a detail view taken upon an enlarged scale in vertical section substantially upon the plane indicated by the section line 11—11 of FIGURE 1.

Figure 1:
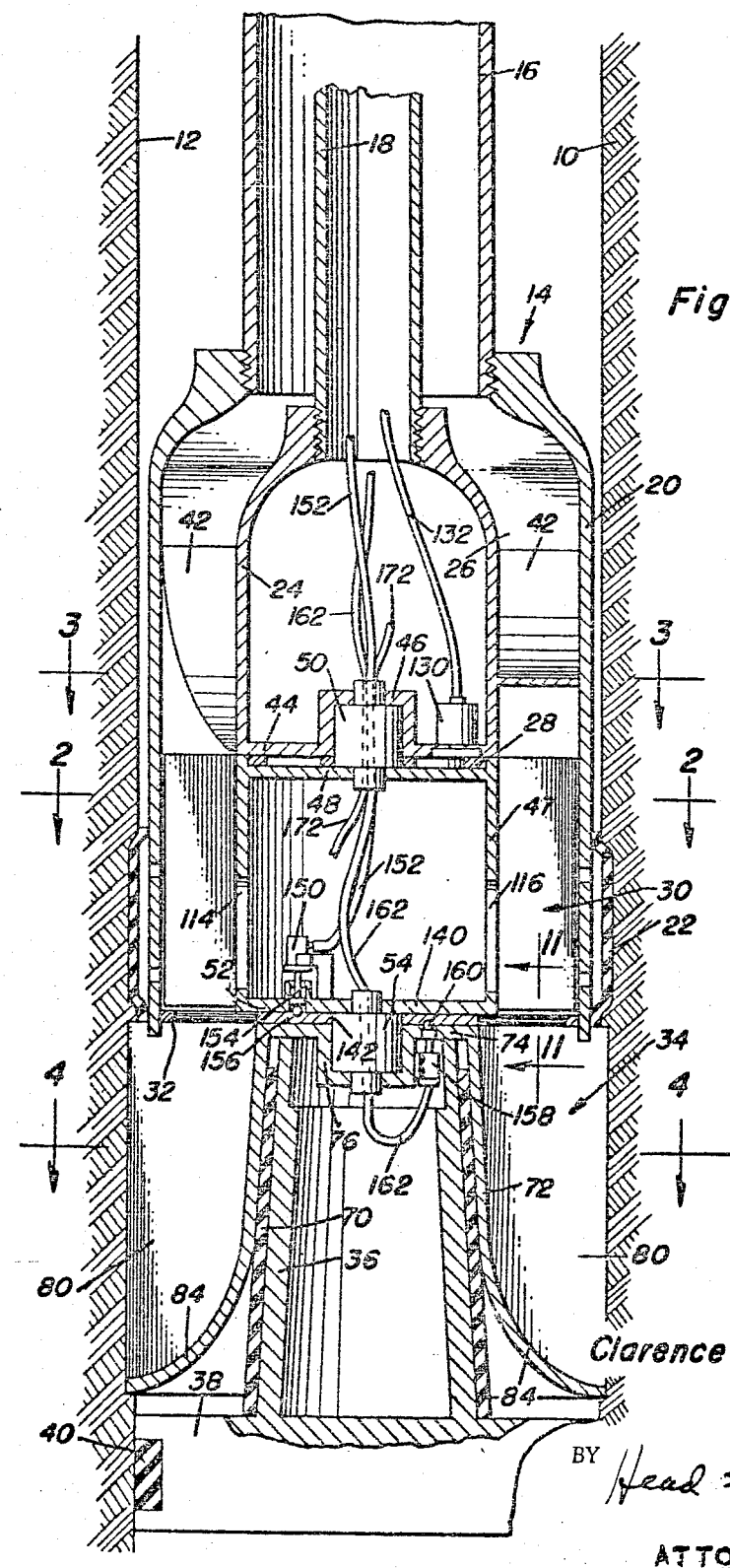

FIGURE 19 is a diagrammatic view illustrating various control and operational methods and processes that may be controllably and selectively used in the various processes of this invention as applied to increase of production from reservoirs of variable permeability and/or porosity, or from reservoirs wherein water and/or gas sections are in permeable communication with the matrix containing most of the productive oil and gas.

FIGURE 20 is a diagrammatic view illustrating various control and operational methods and processes that may be controllably and selectively used to treat with pressured fluids and sonic energy selected sections of the formation within reservoirs of variable permeability and/or porosity, or reservoirs containing water and/or gas sections in permeable communication with the matrix of the formation containing most of the productive oil and gas, so that increased production of the desired fluid may result.

GENERAL DESCRIPTION

A considerable number of years of field and laboratory experimentation as to the use of sonic waves with fluids as to treating and producing from productive strata of variable permeability and/or porosity, have shown some peculiar and worthwhile characteristics of the use of fluids and sonic waves not seemingly known by others and heretofore only anticipated in my prior mentioned copending applications.

That is to say, that sonic waves of rather uniform characteristics or symmetry of wave form as taught by others prior to my teaching, when used with fluids in treating (fracturing, acidizing, cementing, etc.) and increase of production (secondary recovery driving, decreasing viscosity, pumping, etc.), although certain benefits may accrue due to the use, yet in the large number of reservoirs of variable permeability and/or porosity the use of this type of sonic wave and fluids tends to follow the pattern of pressured fluids without sonic waves and treat and cause increase of production from principally the most permeable and/or porous sections of the stratified formations, which is of course not economically or conservatively desirable.

On the other hand, as taught in this invention and my copending and prior sonic inventions, there are certain types of sonic waves that when used with fluids in such a manner that at certain frequencies and fluid pressures if there are caused to be, either cyclically or at a periodic modulation of a cyclic multiple, certain substantially instantaneous pressure peaks of sonic wave pressure and fluid pressure imposed upon the face of stratified formations of varying permeabilities and/or porosities, and if there is cyclically or as a cyclic multiple a controlled and selected proper low pressure and time extended (compared to the peaked fluid and sonic pressure portion) withdrawal of both sonic and fluid pressure, then the strata containing the finer or smaller pores and/or lesser capillarity of interstitial permeability will be allowed and caused to be retentive of and build-up pressures greater than those strata of greater or more porosity and/or permeability wherein the build up and release of fluid and sonic pressure leaves little retention of either the peaked fluid and sonic cyclic pressures. The whole matter of success of this method is one of relative percentage of the portions of the cyclically imposed higher pressures of fluid and sonic energy that is retained in the various portions of the stratified formation.

Thus, as to the above, field tests in deeper reservoirs where peaked pressures of fluid and sonic energy in excess of 4,000 p.s.i. above the hydrostatic head of fluid in the well has been continuously, either cyclically or at cyclic multiples, impressed into and withdrawn to a low pressure approaching absolute zero or at least no more than the hydrostatic head of fluid in the well bore at the face of the formation, show that in the more permeable strata the fluid and sonic energy may be cyclically injected and withdrawn and the median pressure remaining on the formation outwardly in these more permeable and/or porous strata will be but slightly above the average pressure of the injected fluids and the median pressure between the condensed and rarefied portions of the sonic wave.

However, by proper cyclic injection of both peaked fluid and sonic pressure and cyclic withdrawal and release thereof as taught in this application and my prior copending applications, the smaller the pores and/or the lesser the permeability, relative to the rest of the stratified formation, then the higher the peaked fluid and sonic energy pressures that will be retained relative to the rest of the stratified formation. In other words, there is a time element and a greater reluctance to release these peaked injections of fluid and sonic pressures, that will, by proper and selective manipulations that will cause increasing areal buildup of pressures in the less permeable and/or porous sections of the stratified formation, which may be used for the various treating processes such as fracturing, acidizing, etc., or the obtaining of production such as by secondary recovery, mixing of solvents, miscible fluids or gases in the more viscous crudes, pumping, etc., from substantially all of the area of these stratified formations, which before now has been impossible of achievement.

It has been found that the use of sonic waves and fluids as heretofore taught by others, such as using sonic waves either with fluids being solely pumped into, removed from, or remaining stagnant in well bores in reservoirs, will not either treat or increase production much over conventional methods from reservoirs of highly variable permeability and/or porosity. For, as above explained, there would be but pulsing fluids that would be either uni-directionally moving or in a static position, and due to the increased area of movement allowed in the more open sections of the formation the pulsations would be of greater amplitude and the flow of fluids greatly increased in these areas where it is not desirable to have it be so.

Further, it has been found that gases introduced as taught in this application, as well as in my prior copending applications, greatly enhances the method herein and lowers the energy needed to treat and/or increase production from these reservoirs of variation of porosity and/or permeability. Especially is this so when gases are used of a type that are liquefiable at the face of the formation under the cyclic peaked pressures of fluid and sonic energy, but become controllable and selectively vaporous under the cyclic or at a cyclic multiple of withdrawals and releases from the face of the formation. For in the smallest of the varying interstitial capillaries and pores the cyclic peaked fluid and sonic pressure would tend to substantially cause an adding of the gas in liquid form to the fluids of the formations where it would prove to be a viscosity reducing agent, while progressively where the permeability and/or porosity in other sections of the stratified formation the liquefying and expansions to vapor of the injected gas would be an assisting and motivating factor in allowing the cyclic withdrawals of fluid and sonic energy and thus assist in preventing an excess of fluids and sonic energy escaping or channeling through these more open zones or sections within the stratified reservoir.

Further, in the use of gases as taught in this application as applied to oil bearing formations of the type wherein gas in solution in the producing oil is the principal means for production therefrom and wherein water bearing strata is in permeable connection therewith, it may be preferable to use a gas that is miscible to the oil and gas of the formation but immiscible to others of the drive fluids including water. In such a reservoir, particularly one wherein economic primary production has been depleted, a conventional water drive will allow a substantial portion of the drive water to go from injection well to production well through the usually more permeable water section and gradually and increasingly become the principal fluid produced by the production well.

What greatly intensifies the above increase of production of water from stratified reservoirs containing a water section or wherein a more permeable and/or porous section of an oil and gas section has been taken over by drive water and becomes interstitial channels for flow of the injected flood water to the production well, is that the very drive force for the primary production, which is the gas in solution with the oil before the initiation of any production from the reservoir, has now begun to come out of solution from the oil and forms and causes a discontinuous oil phase within the interstices of the formation which by increasing multitudinous surface tensions gradually blocks the movement of the oil to the production well.

This above discontinuous oil phase increases the amount of surface tension of oil droplets with decrease of pressure within the interstices of a producing reservoir as from continued production, and which is sometimes termed the Jamin effect, causes particularly ineffective results for increase of desired production as to the various treating processes and secondary recoveries when there is a water or gas section of the formation in permeable association with the well through which the treating process or drive fluid is being introduced. The gas or water section, each being a substantially one phase fluid at the temperatures and pressures encountered within the reservoir and having but slight varying characteristics of increasing interstitial capillary Jamin effect blocking as the economical production of the reservoir nears depletion, will each, or both where both occur, form a more easily traversed interstitial channel for entry of various treating fluids and/or drive fluids.

However, by correct proper controlled and selectable use of cyclic, substantially instantaneous peaked pressures of sonic energy and fluids including certain gases into these formations and withdrawals and releases therefrom, it has been found that at least a two-phase condition of fluids may be caused, induced into and maintained in operable condition within these single phase gaseous and/or aqueous fluids, whereby a readily controllable and maintained discontinuity of liquid and vapor may be caused to form extensive areas of Jamin effect, capillary blocked interstices of the formation, whereas these undesirable gaseous and/or aqueous fluids have formerly been the principal production from production wells to the exclusion of the desired oil production.

A similar conditions exists wherein various treating fluids such as fracturing fluids, types of acids, etc., have been pumped into and lost into those areas or sections of these single phase undesirable gaseous and/or aqueous fluids. The treatment for increase of production has resulted in an increase of the undesired fluids with the matrix containing the oil sections being substantially by-passed with the treatment. Proper manipulation and control of fluids including gases together with sonic energy being cyclically introduced into the face of these formations as peaked pressures and withdrawn as rarefactions of controlled low pressure, may be caused to become areas or sections of the formations that will have greater resistance of interstitial blocking than the matrix of the oil bearing sections of the formation, with the desired result of causing the treatment of the formation to be within these oil sections and the increase of production at the production wells to be principally oil.

Also, in the use of drive fluids in secondary recovery where at the start the fluids will often enter the injection wells with no surface pressures being applied to the fluids, yet with greater areal sweep of the reservoir with the drive fluid the pressure buildup on the drive fluid normally increases as the injection of the drive fluid continues.

One of the principal causes of this pressure buildup of the drive fluids is that interstitial blocking or the Jamin effect resistance of the formation increases with continued outward sweep of the drive fluid because of the multitudinous interstitial capillary-like disconnections of oil and gas and of drive fluids that rapidly increase with distance traversed by the drive fluids. Should new wells be drilled periodically at the outward extent of the drive fluids and where banking of the accumulated oil and gas is maintained, then in many reservoirs the drive fluids could again be injected into these new injection wells with substantially no surface pressure being necessary.

Many operators have attempted to duplicate what the drilling of new injection wells would accomplish, i.e., conventionally fracturing injection wells after a certain time period of sustained injection and using propping agents to maintain channels of lessened interstitial blocking towards the banked up face of the driven oil and gas. This type of uncontrollable fracturing into reservoirs for decreased drive pressures often result in bypassing substantially most of the oil and gas remaining in the matrix of the reservoir, due to the before now non-prevention of others of the fracturing fluids following the paths of least resistance in the reservoir, which could be more permeable or porous stratas, or water or gas sections in permeable communication with the matrix of the reservoir wherein is contained most of the oil and gas.

However, by following the methods and processes of this invention and of my copending applications, it has been found to be possible by correct manipulative control of simultaneous injections and withdrawals of pressured fluids and sonic waves in the manner previously taught in this application, to create and progressively maintain fractured channels to the banked up face of the driven oil and gas and simultaneously drive oil and gas from substantially all of the reservoir at fluid injection pressures never heretofore possible. Not only has it been possible by proper control, as hereinbefore taught, to create and maintain fractured and ruptured channels in the less permeable and porous sections so as to present a substantially uniform bank of driven oil and gas throughout all of the vertical height of a highly stratified reservoir, but by these proper manipulations of fluids and sonic waves it has been possible to cause a continued for some time weekly decline in fluid injection pressures within reservoirs wherein continued previous fluid injection has increased fluid injection pressures by the hereinabove shown increased areal extent of interstitial blocking of the reservoir.

In one reservoir where the methods of this invention were used to create an increase of production from strata of considerable variation of permeability throughout the height of the productive strata, one injection well was used as a means of testing what increase of production could be caused at production wells by the use of my methods of controllable injection and release of fluids and sonic wave energy to simultaneously controllably drive interstitial fluids to the production wells and to fracture the less permeable portions of the strata at the oil and gas interface back in the formation where the drive fluids had the banked up oil and gas front.

This particular injection well had penetrated strata of not only considerable variation of permeability but also of low permeability throughout all of the height of the strata. Multifracing of the formation by high injection rates had been attempted on the strata contacted by the well bore and considerable sand had been injected with the fracturing fluid when the various fracturing treatments had in turn been given to the strata.

Yet this selective multifracing at high injection rates had not materially caused a continued increase of injection of drive fluids into the injection well, so that within a few days injection rates of fluid dropped to their former few barrels of fluid a day. This injection well was so ineffective that after more than a year of injection of drive fluid the nearest offset production well had shown no increase of production.

When drive fluids and sonic wave energy were cyclically and controllably used on this injection well for a few hours at low pressures and intensity there began an almost immediate large increase of gas from this offset production well, but only a small increase of oil production.

However, when injection pressures of fluids and sonic wave energy were increased to intensities sufficient to cause lifting of the overburden within the formation and controllable fracturing of the less permeable portions of the strata at the oil and gas front or interface at the distance the drive fluid had driven accumulated oil and gas, then within a matter of hours the offset production well began a large increase of oil production with no water content but considerable increase of the production.

What surprised the operator of the lease was the fact that almost simultaneously with the increase of oil and gas at the offset well, there occurred substantial increases of oil and gas at other production wells on the lease, some of which wells were more than a half of a mile away from the injection well upon which the methods of this invention were being used.

After less than eighteen hours of use of simultaneous controllable use of injection and releasing of drive fluids and intense sonic wave energy in such a controlled manner as to drive interstitial fluids from and to fracture the less permeable portions of the strata, during which time overall injection of drive fluid had not been increased over what it was prior to the treatment, then total production from the lease was increased by over fifty percent for more than thirty days thereafter, with no increase of water production over what the lease had been producing prior to the less than eighteen hours use of the methods as disclosed in this application.

It was of particular interest to note that the production wells that showed the substantial increase of production after the sonic wave treatment was given to the one injection well, were production wells adjacent a line of injection wells among which was the injection well upon which the sonic wave treatment was given.

GENERAL ORGANIZATION OF THE EMBODIMENT OF FIGURES 1–11

Referring first to FIGURE 1 there is disclosed a portion of a formation 10, to be treated in accordance with this invention, which formation may comprise an oil bearing formation. In order to apply a pulsating fluid and sonic wave drive to this formation for treating the same, use is made of a well bore 12 of any desired character penetrating into the formation whereby access is had to a face of the formation. The novel apparatus forming the subject of this invention is designated generally by the numeral 14 and may be conveniently and readily introduced into and removed from the well bore in any desired manner, as for example by mounting the apparatus upon the lower end of a string of tubing or well casing 16 through which the fluid of the pressure drive or the treating fluid and substance is adapted to be supplied into the well bore and formation.

Disposed within the tubing or well casing 16 is a further string of tubing 18 which comprises a return line whereby the pressure drive fluid or treating fluid and substance after being applied to the formation as set forth hereinafter, may be returned to the surface, it being intended to continuously recirculate a proportion of the pressure drive or treating fluid.

Figure 6:
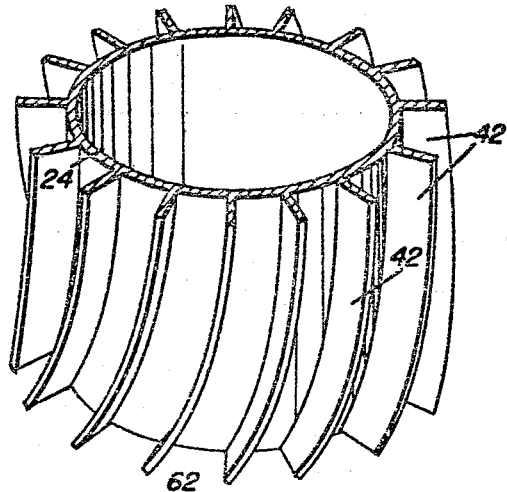

The apparatus 14 includes among its components a stationary outer casing 20 which is adapted to be detachably secured as by screw threads at the lower end of the string of tubing or casing 16, this casing enclosing certain of the elements composing the apparatus, as being provided upon its exterior and at its lower end with an expansible packer or anchor 22. Within the housing 20 is a centrally disposed stationary inner casing or housing 24. This housing 24 is removably secured by screw threads to the end of the string of tubing 18. The housings 20 and 24 are preferably equidistantly spaced and are cylindrical in shape in order to provide an annular chamber 26 therebetween, which chamber communicates with the interior of the tubing or casing string 16. The member 24 upon its external surface carries a plurality of longitudinally extending circumferentially spaced diffuser vanes or fins 42 whose particular arrangement is shown in FIGURES 3 and 6.

Figure 7:
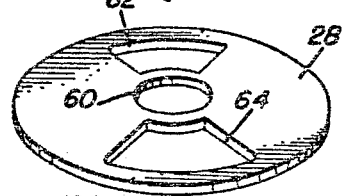
Figure 8:
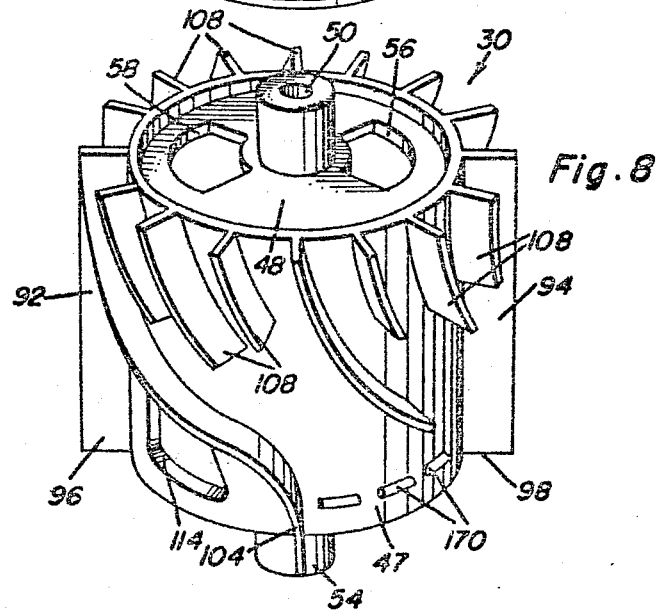

The components of the device further include a control valve 28, shown in FIGURE 7; and a freely rotatable combined turbine rotor and rotary fluid and sonic energy distributor 30 disclosed in FIGURE 8. Below the turbine rotor there is provided a high frequency wave generator 32 (see FIGURE 9) and a stationary fluid and sonic energy wave radiating, distributing and diffusing vane assembly 34 of the construction shown in FIGURE 10. The stationary radiator and distributor 34 is mounted upon a stationary supporting arbor or mandrel 36 rising from a supporting base 38 which is removably secured and sealed to the side of the well bore 12 as by a conventional packer assembly 40 operated by any conventional means (not shown).

ROTARY DISTRIBUTOR AND TURBINE ASSEMBLY

The rotary distributor and turbine assembly includes the members 20, 24, 28, 30, 32 and 34. Referring first to FIGURES 1, 3 and 6, it will be observed that the inner cylindrical casing or sleeve 24 is provided upon its exterior surface with a plurality of curved ribs, fins or vanes 42. These vanes each extend radially outwardly from the sleeve forming the body portion of the member 24, but are spirally curved along their longitudinal extent upon the sleeve, and are given such a contour and shape as will serve to direct the downwardly flowing stream of pressure fluid and/or sonic energy to discharge the same at the most effective angle and to the best advanage against the turbine rotor blades and thus impart rotation thereto. The vanes 42 extend outwardly from the central sleeve member 24 through the annular chamber 26 and into either closely spaced relation with respect to the wall of the member 20; or preferably into secure and fixed engagement therewith. In any event, as will be apparent from FIGURE 3, the vanes 42 serve to divide the annular chamber 26 into a plurality of circumferentially spaced passages, the curving contour of the vanes 42 serving to direct the flow of these passages at a predetermined angular relation with respect to the vertical central axis of the device.

Across the bottom end of the sleeve 24, as shown more clearly in FIGURE 3, there is provided a diametrically disposed plate or spider 44 having a circular enlarged upwardly extending tubular boss 46.

Attention is now directed more specifically to FIGURES 1, 2 and 8 for a consideration of the freely rotating turbine rotor and rotary distributor 30. This member consists of a hollow, sleeve or cylindrical body 47 having a flat circular or top wall 48 which however is downwardly recessed with regard to the upper end of the body 47 to receive the control valve 28 as set forth hereinafter. Extending axially upwardly from this top wall is a cylindrical boss comprising a bearing member 50 which is journalled in the above mentioned axially depending tubular boss 46 of the member 24. At its lower end, the cylindrical body 47 has its central portion closed as by the circular bottom wall 52 and a further cylindrical boss constituting a bearing 54 projects axially downwardly therefrom for journalling in a manner to be subsequently set forth.

The top wall 48, see FIGURE 8, is provided with a pair of arcuately extending fluid return ports or passages 56 and 58, each extending preferably through substantially 90° of the circumference of the top wall and being oppositely disposed thereon. The previously mentioned valve member 28, see FIGURE 7, is preferably in the form of a circular disk and is provided with a central aperture 60 which is rotatably journalled upon the bearing projection 50, when the disk 28 is seated in the recess in the upper end of the cylindrical body 47 and is rotatably disposed upon the recessed top wall 48. By means of the vertical upper and lower journals 50 and 54, seated in the stationary bearings 46 and 76, the member 30 is mounted for free rotation about its vertical axis.

The valve disk is also provided with a pair of ports 62 and 64 which are oppositely disposed upon the valve disk and each of which also extends through 90° of the circumference of the disk, these ports being complementary to the ports 56 and 58 previously mentioned. The arrangement and proportions are such that as shown in FIGURE 1, in the assembled position of the turbine rotor and the diffuser vane assembly, the valve disk is snugly rotatably received between the spider 44 and the top wall 48.

The valve disk 28 and the top wall 48 constituting a valve seat cooperate as a valve assembly. During normal operation of the apparatus, the valve disk rotates as a unit with the turbine rotor 30, the ports 62 and 64 remaining in registry with the ports 56 and 58. This places the space within the cylindrical body 17 in constant communication with the interior of the body 24 and the fluid and sonic energy return tubing 18. However, as set forth hereinafter, means are provided whereby the valve disk 28 may be locked to the stationary body 24 through the spider 44 to periodically interrupt the return flow of the fluid and sonic energy transmitting medium and thus produce a "water hammer" or violent shock waves in the fluid medium and elastic sonic wave transmitting means.

The base 38 preferably consists of a flattened drum of any suitable material or construction, and is provided with a circumferentially disposed packer 40 which may be of any known and conventional construction and is adapted to be expanded outwardly against the wall of the well bore 12 operated by any conventional means (not shown) for anchoring the base in place. Rising centrally from the base is a hollow conical arbor or mandrel 36 which as shown in FIGURE 1 is open at its upper end. Secured in any suitable manner to the exterior conical surface of the mandrel is a conical sleeve 70 of rubber or other suitable cushioning material.

The stationary radiating and distributor vane assembly 34 is adapted to be fixedly secured upon the mandrel. This assembly, see FIGURES 1, 4 and 10, consists of a conical wall 72 of a shape and size to be snugly and tightly fitted upon the cushioning sleeve 70 when the distributor and radiator assembly is pressed downwardly upon the mandrel in the manner shown in FIGURE 1. At its upper end, the conical wall 72 is provided with a circular closure disk 74 which has a centrally disposed cup-shaped recess 76 therein. This recess rotatably receives and journals the above mentioned lower cylindrical bearing 54 of the rotor 30. The conical wall 72 is provided with a plurality of vertically (see FIGURE 1) extending slots 78, extending from the bottom of the wall 72 upwardly a sufficient distance to impart radial resiliency to the wall to thus permit the same to be frictionally clamped and pressed upon the mandrel. Ribs, vanes or fins 80 extend radially from the side wall 72 along substantially the entire vertical height of the same, and these ribs are of such size as to be pressed into the wall of the well bore 12 when the assembly is expanded radially as it is pressed downwardly upon the mandrel in the manner shown in FIGURE 1. Thus, the ribs or fins 80, being pressed into the wall of the formation establish a sealing engagement which assists in preventing rotation of the assembly 34 and which also prevents flow of fluid and sonic energy circumferentially of the member 34 between the vertical channels formed between adjacent ribs 80.

At their lower ends the ribs 80 are provided with curved edges 82 and correspondingly curved bottom walls or webs 84 are jointed to these edges and are pressed into the wall of the well bore. The contour of the bottom walls 84 is such that the sonic wave energy and fluid pressure medium discharged downwardly between adjacent fins or ribs 80 will be deflected and curved outwardly against the face of the formation through which the well bore extends. It will be observed that the bottom walls 84 have slots 86 constituting extension of the slots 78 previously mentioned.

Disposed at equal angular intervals about the circumference of the wall of the cylindrical body 47 are a plurality of turbine vanes of specific contours and disposition as set forth hereinafter. These vanes have their upper ends terminating flush with the top wall of the rotor, as will be apparent from FIGURE 8. At their upper ends, these vanes are so disposed that they will register exactly with the lower ends of the stationary diffuser vanes 42 and of the member 24. This arrangement is such that the fluid directed by the lower ends of the vanes 42 in a direction to most effectively impact upon the upper ends of the rotor vanes. Thus, in the usual manner with turbines, the fluid medium under pressure will be directed against a rotor vane so as to impart rotation thereto.

However, although the plurality of streams of fluid and/or sonic energy from the vanes 42, and which are fed thereto by the annular passage 26, are delivered to the upper portion of the turbine rotor around the entire circumference of the same, in a continuous manner, this fluid and sonic energy is discharged at the lower end of the same from only two diametrically opposite quadrant sectors of the rotor. To effect this function, the plurality of vanes are given such a curvature that the fluid received around the entire circumference of the upper portion of the rotor is caused to converge and be divided and discharged from two oppositely disposed quadrants at the lower surface of the same, for the hereinafter disclosed purpose of being a generator of cyclic fluid and sonic energy peaked pressure pulsed waves for entry into the interstices of the formation.

Figure 5:
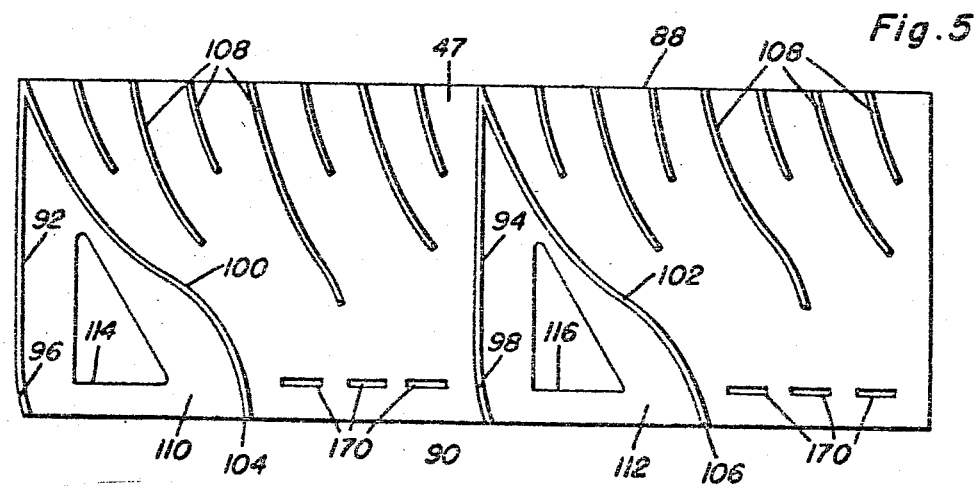
FIGURE 5 is an elevational development view of the exterior construction of the turbine rotor and sonic generator in order to show more clearly the particular and novel arrangement of the fins or vanes thereon.

Referring to FIGURE 5, it will be seen that the upper edge of the turbine rotor in the development view therein, has been indicated by the number 88, while the lower edge is indicated at 90. Upon opposite sides of the cylindrical surface of the body 47 there are provided a pair of substantially vertical or axially extending vanes 92 and 94 which extend from top to bottom of the rotor, and their lower ends may be slightly curved as at 96 and 98 to improve fluid flow. Also starting from the upper ends of the vanes 92 and 94 are a pair of curved dividing vanes 100 and 102 whose lower ends intersect the bottom edge 90 of the rotor at the points 104 and 106, these points being equidistantly spaced between the previously mentioned vertical ribs or vanes 96 and 98. Thus, the lower edge of the turbine rotor is divided into four equal portions or quadrants, while the upper edge is divided into two equal portions by the lower and upper ends respectively of the vanes 92, 94, 100 and 102. As so far described, it will now be apparent that the fluid and sonic energy passing about one-half of the entire circumference of the upper portion of the turbine is discharged into the oppositely disposed quadrants at the lower portion of the turbine, these quadrants lying between the vanes 100 and 94 and 102 and 92, respectively. Thus, there is no down flowing fluid or sonic energy in the two triangular shaped quadrant sectors of the rotor circumference which are bounded by the vanes 92 and 100 and the vanes 94 and 102.

Disposed between the vanes 100 and 94 and the vanes 102 and 92 are a plurality of intermediate rotor blades 108 each of an appropriate contour for proportioning and directing the fluid and sonic energy flow passing between their respective guiding and directing vanes 100 and 94; and 102 and 92. These intermediate vanes will of course be of the size, shape and contour for most efficiently performing the customary functions of turbine blades.

From a study of FIGURES 5 and 8 it will be seen that the wedge-shaped or triangular segments lying between the vanes 92 and 100 and the vanes 94 and 102, and identified by the numeral 110 and 112 are sealed off from the downward flow of the fluid medium and sonic energy passing through the turbine rotor. These triangular spaces are provided with triangular shaped openings or ports 114 and 116 which are closed from the top of the rotor but are open to the bottom thereof and which serve to admit the return flow of the sonic wave energy and fluid medium from the interstices of the formation as set forth hereinafter, into the interior of the cylindrical body 47 from whence it passes, as previously described, through the device and into the return tubing 18, from whence it may be allowed to be bled off or produced at the surface under a controlled pressure, for purposes seen and stated hereinlater.

As so far described, it will now be seen that two diametrically disposed quadrants upon the lower surface of the rotor continuously deliver the sonic energy and fluid medium downwardly through the rotor and into the stationary radiating distributor vane assembly 34; while the other two oppositely disposed quadrants 110 and 112 constitute a return means for the fluid and sonic energy previously delivered to the member 34 and therethrough into the interstices of the formation.

Figure 4:
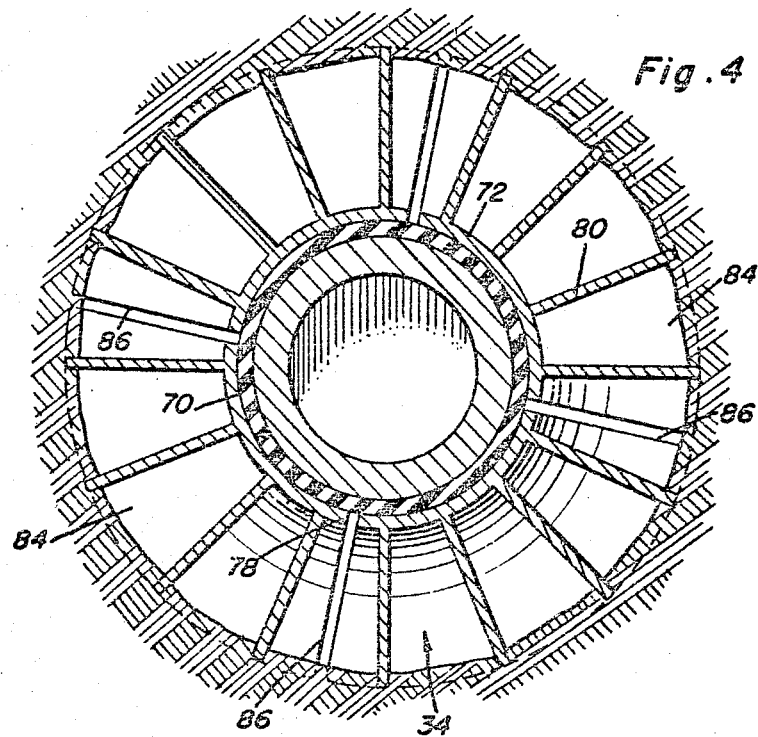
FIGURE 4 is a horizontal sectional view taken substantially upon the plane indicated by the section line 4—4 of FIGURE 1 and illustrating in particular the construction and the mounting of the stationary distributor and radiator vane assembly for applying the pulsating fluid and sonic wave pressure to a formation.

As will be apparent from FIGURES 4 and 10, the stationary distributing sonic energy and fluid radiator vane assembly 34 has the same number of vertical vanes 80 as there are vanes 42 in the sleeve 24 and as there are vanes upon the rotor 30. Thus, there is a continuous, although reversely curving passage starting at the top of the vanes 42 and ending at the bottom portion of the vanes 80 whereby the fluid medium after passing through the turbine rotor is fed or delivered in the same number of streams at which it entered the upper stationary diffuser vane assembly, against the face of the formation in the well bore. However, in view of the distributing and sonic wave generating function of the rotor, these fluid streams are temporarily laterally displaced as they pass through the rotor.

It will now be apparent that at a given moment, the entire fluid intake of the turbine rotor is discharged at a peaked pressure sonic pulse into two quadrants, each of 90° circumferential extent, from the vanes 80 of the vane assembly 34; and that as the rotor turns, these quadrants whereby the fluid is applied under pressure into the interstices of the formation, rotate or progress around the face of the formation in the well bore. Thus, for each 90° rotation of the rotor, it will be seen that two quadrants are pressurizing the formation and forming a peaked pressure half wave pulse of fluid and sonic energy, while the other two quadrants are relieving the fluid and sonic energy pressure previously applied to the interstices of the formation; and this action progresses circumferentially and in alteration as the rotor turns. By this means, the fluid pressure medium is caused to impart periodic alternate applications of fluid and sonic energy half wave peaked pressure to and half wave low pressure withdrawals of fluid and sonic energy from the interstices of the formation in a continuing sequence. Thus, the pressure medium is caused to impart a pulsating fluid and sonic energy pressure effect to the interstices of a formation which has been found to be highly efficacious in aiding the secondary recovery of oil therefrom; introducing by these pulsations of fluid and sonic energy an energy transmitting high frequency wave in the interstices of the medium in the formation which wave in itself penetrates into the fluids of the formation and upon attenuation releases its energy in the fluids of the formation in the form of heat of physical impulses and thereby assists in reducing the viscosity of these fluids.

HAMMER VALVE ASSEMBLY

As shown in FIGURES 1 and 3, the spider 44 has mounted thereon a fluid pressure operated device 130 which is preferably in the form of a cylinder and to which fluid pressure is applied as by a pipe or conduit 132 which may extend through the string of tubing 18. Movable within the cylinder 130 is a fluid pressure actuated member, such as a plunger, diaphragm or the like, not shown, and which extends through a corresponding opening in the spider 44 whereby the same may be caused by the application of fluid pressure to frictionally engage the upper surface of the valve disk 28. Since the fluid pressure actuated device is of any one of a number of conventional and known types, a detailed description of the same is deemed to be unnecessary for the purposes of understanding the principles of this invention. Alternatively, any other type of latch means may be employed to selectively hold the valve disk against rotation, the invention not being limited to any particular construction for this purpose.

In operation, the valve disk normally rotates with the cylindrical body 47 as previously set forth. It is contemplated that the flow of fluid and sonic energy through the aligned ports or apertures in the valve disk and the top wall 48 of the cylindrical body will assist in keeping the ports aligned and causing the valve disk to rotate with the body. However, when a pressure is applied through the conduit 132 to the actuator 130, the frictional engagement of the actuator upon the valve disk will wither to completely stop further rotation of the valve disk; or will retard the rotation of the same relative to the rotation of the cylindrical body 47. When the disk is completely stopped, it is evident that each rotation of the body 47 will intermittently interrupt the return flow of the rarefied half wave sonic energy and the fluid medium. This interruption will result in a hammer shock as the moving medium and rarefied half wave low pressure portion of the sonic wave is suddenly halted in its motion. This hammer shock will result in high frequency high pressure peaked shock waves being set up in the fluid medium as modulations imposed upon the sonic energy waves and through the fluid transmitting medium being imparted to the fluid in the interstices of the formation contacted by the same.

It will be evident that the force applied in this hammer shock wave modulation means may be graduated or regulated by varying the speed at which the ports in the valve assembly are closed, and this variation is of course effected by the frictional drag applied to the valve disk through the pressure operated device 130. Thus, this arrangement provides a means for imparting controllable modulating hammer shock waves to the sonic waves radiating into the interstices of the formation and thus form selectable types of peaked pressure high frequency vibrations in the fluid medium, as desired.

HIGH FREQUENCY WAVE GENERATOR

Reference is next made to FIGURES 1, 9 and 11 for an understanding of a high frequency wave generating device which forms a part of the apparatus and which may be selectively placed into or out of operation.

The member 32 consists of a circular disk provided with a circular central portion or hub 140 which is apertured, as at 142. The hub 140 rests upon the top well 74 of the member 34 with the aperture 142 surrounding the bearing 54 of the turbine rotor.

A plurality of radially extending vanes or blades 144 radiate from the hub portion 140 and constitute spokes which support the annular rim 146. The latter is received within the lower end of the skirt portion of the member 20 and has a snug rotating fit therein.

The blades or spokes 144 are preferably V-shaped in cross-section with their apex at the top and with their sides downwardly diverging, as clearly shown in FIGURE 9 and in FIGURE 11. The blades or spokes 144 are of sufficient length to extend substantially entirely across the annular passage lying between the external surface of the cylindrical wall of the body 47 and the internal cylindrical surface of the member 20, and thus extend across the downwardly flowing stream of the fluid medium.

If desired, the undersurface of the spokes could also be provided with a downwardly directed knife edge similar to the upwardly directed knife edge just described, whereby the returning or upflowing stream of fluid would encounter the knife edges during its upward flow.

As will be seen from FIGURE 1, the hub portion 140 is rotatably received betwen the bottom wall 52 of the body 47 and the top wall 74 of the element 34. Means are provided for selectively locking the generator 32 to the top wall 74 or to the bottom wall 52. This means preferably comprises one or more detents or recesses 148 in the upper surface of the hub 140, and similar recesses in the lower surface of the same. Suitably mounted within the interior of the cylindrical body 47 is a fluid pressure actuated device 150 to which fluid pressure is supplied as by a conduit 152. Forming a part of the device 150 is a vertically reciprocable plunger 154 which upon downward movement is adapted to engage the detent or locking ball 156 and press the same downwardly through an opening in the bottom wall 52 into one of the locking detents 148 to thereby lock or latch the hub 140 to the bottom wall 52 for rotation with the turbine rotor. When locked in this position, the spaces between the blades 144 will register with the spaces or passages between the turbine blades and thus there will be no relative rotation between the blades 144 and the turbine blades or vanes.

Suitably mounted within the hollow mandrel or arbor 36 is a pressure actuated device 158 similar to the device 150 and which likewise actuates a locking ball 160 to engage the locking detents from the underside of the hub 140. Fluid pressure is supplied to the actuator 158 by means of a conduit 162. The two conduits extend through swivel connections of any conventional character and which are disposed axially of the bearing member 50, while the conduit 162 also extends through similar swivelling connections in the bearing member 54. The two conduits may conveniently be disposed for passage up the string of tubing 18 whereby the three conduits 132, 152, and 162 may be connected to any suitable fluid pressure source and pressure control means disposed at the surface of the well bore.

This arrangement is such that the pressure actuated devices 150 and 158 may be selectively energized to selectively lock the wave generating member 32 to the turbine rotor for rotation therewith as a unit; or to the stationary member 34. When rotating with the turbine rotor, the wave generator may be considered to be in its inoperative or inactive position, since there is no affect upon the flow of fluid either upwardly or downwardly through the same. However, when the generator is locked to the stationary vane assembly 34, the relative rotation of the fluid discharged by or passing into the turbine rotor will move across the knife edges of the members 144 and thus will have imparted thereto a high frequency vibratory motion. It will be observed that when locked to the member 34, the blades 144 will be in line with the blades 80, while when locked to the turbine rotor, they will be in l:ne with the vanes 108. Thus, the high frequency wave generating device 32 may be selectively rendered operative or inoperative as desired, and thus constitutes a means for imposing additional high frequency modulating vibrations upon the pressured sonic energy and fluid medium passing through the apparatus.

INTRODUCTION OF GASES

Provision is also made for more effectively introducing gases into the fluid and sonic energy pressure medium for the treatment of formations, vapor lift and other purposes in accordance with conventional practice, as well as in conjunction with the various methods of treating of, secondary recovery from, and the production from reservoirs of variable permeability and/or porosity containing oil, gas and other connate fluids as are discussed in this application. While gases such as carbon dioxide, nitrogen or volatile liquefiable gases may be introduced into the sonic wave and fluid pressure medium before the same is supplied to the radiating diffuser vane assembly 24, it is preferred to provide a gas introducing means associated with the sonic wave generating turbine rotor and fluid and sonic wave radiator and distributor 30.

For this purpose a plurality of gas discharge slots 170 are provided in the lower portion of the wall of the cylindrical body 47, between the vanes 104 and 98 and betwen the vanes 102 and 92. Then slots extend circumferentially of the radiator and distributor and lie in those quadrants through which the sonic wave and fluid pressure medium is flowing towards and into the interstices of the formation, whereby the introduced gases will be carried and applied to the interstices of the formation by the pressured fluid and sonic wave medium.

In order to supply the gases to be inducted, a suitable conduit or passage system 172 is provided, which is mechanically associated with the bottom hole device 14 in the same manner as the previously described fluid pressure conduits 132, 152 and 162, and is connected at the surface to compressed gas supply means 180 in a manner hereinafter described in detail. Although the gas supplying conduit 172 by way of illustration is shown as being of small diameter and carrying capacity, yet it is to be understood that conduits proportionate to the size needed or desired may be used when it is found to be necessary for performance of the methods disclosed as to the type of fluid productive reservoir to which this invention is directed.

OPERATION

The embodiment of the apparatus disclosed in FIGURES 1–11 and 19 and 20 is capable of several important different modes of controllable and selectable operation. First, it may be employed as a means of circulating a fluid pressure medium and for applying fluid pressure sonic wave pulsations and modulating high frequency sonic wave impulses thereon for treating a formation; second, it may be positioned in a flowing well whereby the formation pressure will constitute the driving means for operating the device and producing fluid and sonic wave pressure pulsations for treating the formation; third, it may be used in a flowing well for acquiring to a formation under pressure a diluting medium to facilitate the recovery of oil from the formation; fourth, it may be used to apply gases for treating the formation, or for a vapor lift to assist in the pumping of oil from the well bore; fifth, by controllable and selectable means located at the surface various methods may be used to increase oil recovery from reservoirs of variable permeability and/or porosity; and sixth, by controllable and selectable means operated from the surface various processes may be employed for treating a formation. These several different modes of operation will now be considered in the order mentioned above.

OPERATION OF THE APPARATUS FOR CIRCULATING A PULSATING FLUID AND SONIC WAVE PRESSURE MEDIUM

When it is desired to apply pulsating sonic wave and fluid pressures and/or gases for treating a formation, the device 14 of FIGURES 1–11 is lowered into a well bore into position adjacent the desired portion of a formation which it is desired to treat with the apparatus, and the base 38 is securely locked in place by expanding the packing 40 in a conventional manner. Then the rest of the device is lowered upon this base, the stationary distributing radiator vane assembly 34 being in its radially collapsed position and is lowered down upon the mandrel, and during this lowering movement is radially expanded until the vanes 80 are pressed into the wall of the bore. Then the packer 22 is expanded by fluid under pressure flowing through tubing 16 and the apparatus is thus secured in place ready for use.

A fluid sonic wave generating pressure with which the formation is to be treated is then applied under pressure through the tubing 16 and enters the annular chamber 26. From thence, as set forth in detail in the foregoig description, this fluid and sonic wave pressure passes through the diffuser vanes 42 and is discharged into the upper end of the turbine vanes 100, 102 and 108 of the sonic wave generating turbine rotor and distributor 47. After it passes through the latter, the fluid and sonic energy either alone or within a gaseous or other treating medium supplied through the slots 170 through the conduit 172, passes downwardly into portions of the vanes 80 of the stationary sonic wave and fluid distributing radiator assembly, and from thence are applied to two circumferential oppositely disposed quadrants positioned opposite the space between vanes 100 and 94, and between vanes 102 and 92, of the formation for producing an increase in pressure therein. At the same time, the intermediate two quadrant sections of the formation are connected through the vane assembly to the two quadrant sections 110 and 112 of the rotor body and by means of the ports 114 and 116 permits fluid and sonic energy to flow through the interior of this body and upwardly through the registering ports of the valve assembly members. The fluid and sonic energy then flows upwardly through the tubing 18 to the pumping or sonic wave generating means by which the fluid and sonic energy is circulated. As the sonic wave generating turbine rotor is rotated, alternating regions of half wave fluid and sonic wave peaked pressure impulses and half wave rarefied low pressure release of fluid and sonic energy are applied in sequence to the formation thus producing a pulsating fluid and sonic wave pressure upon the same.

It will be understood that any desired type of pulsations and/or energy transmitting sonic waves may be applied to the fluid pressure medium prior to its introduction into the tubing 16 in order to effect a desired vibratory sonic wave and fluid treatment upon the formation. It will also be apparent that the gases previously referred to may be utilized either in treating the formation itself in combination with the sonic waves, or as a vapor lift to assist in lifting the medium and/or formation liquids from the well bore.

During the above described operation, the high frequency wave generator 32 has been considered to be in its inoperative position, during which it has no effect upon the flow of the fluid and sonic energy medium into or out of the device. However, by actuation of the fluid pressure actuators 150 and 158, the rigid locking of the wave generator 32 to the turbine rotor is released and the generator is locked to the stationary distributing vane assembly 34. When this occurs, the relative rotation of the turbine rotor with respect to the now stationary wave generator 32 causes the sharp edges of the blades 144 of the latter to impart a modulating high frequency vibration to the sonic energy and fluid pressure medium passing through the sonic wave generator. Thus, these high frequency sonic waves are additionally imparted to the formation.

In addition to the selective application of high frequency sonic waves to the fluid and sonic wave pressure medium, the apparatus may also function to impart a further modulation of hammer shock wave thereto for increasing the amplitude and severity of the peaked half wave pressures of fluid and sonic energy. For that purpose, the valve mechanism 28 is either quickly or slowly closed by the mechanism 130 described hereinbefore, causing either an abrupt change in frequency phase or a more gradual stoppage of the upward flow of the fluid and sonic energy medium from the well bore, thereby resulting in the generation of a controllable hammer shock wave modulation therein. This latter sonic wave modulation means is, of course, generated at a frequency proportional to the speed of frequency of rotation of the turbine rotor, and the amplitude and severity of these shock waves modulations to the cyclic alternations of peaked pressure half wave fluid and sonic energy being injected the interstices of the formation is principally governed by the fluid and sonic energy pressure differential maintained between tubing or casing 16 and tubing 18 of FIGURE 1.

OPERATION OF THE DRIVE BY FORMATION PRESSURE OF A FLOWING WELL

In the second mode of operation of the apparatus, the sonic wave pressure impulses applied to the formation are produced by the formation pressure itself of a flowing well and not by a circulating of a fluid and sonic wave pressure medium.

In this arrangement and operation fluids from the formation under the formation pressure flow from the stationary radiator vane assembly 34 upwardly through the sonic wave generating turbine rotor vane assembly and outwardly through the diffuser vanes 42. During this flow the valve assembly may be closed, the valve actuator 130 being of such character as to enable the valve plate to be fixedly latched or secured to the top wall 48 of the cylindrical body 47 with a valve port out of registry with each other. As the formation fluids and any previously created sonic energy flow upwardly under the pressure existing in the formation, it is obvious that the sonic wave generating turbine rotor will rotate in an opposite direction from that previously described, with the rotor quadrants between the vanes 194 and the vanes 102 and 92 permitting passage of this fluid and/or sonic energy and causing rotation of the turbine rotor. With the valve assembly 28 closed, flow through the wedged shape quadrants 110 and 112 of the sonic wave generating rotor is prevented. Thus, the fluid and any sonic wave energy flowing from the formation and into the device is alternately withdrawn and stopped as successive quadrants pass the same region of the formation, thus producing a fluid and sonic wave pulsing effect augmenting the pressure prevailing in the formation in that region. These fluid and sonic wave pulsations may be beneficially employed to treat the formation in the same manner as the peaked pressure fluid and sonic energy pulsations produced in the previously described operation of the device.

In this mode of operation, gases may be introduced to the portion 170 to constitute a vapor lift assisting in the flowing of the fluids and sonic energy from the well bore. Also 170 may be used as a means of controlling or lessening the frequency and/or amplitude of the cyclic alernations of fluid and sonic energy as by allowing some fluid flow from reservoirs having substantially high bottom hole pressures.

Still further, the high frequency vibrating means 32 may be utilized or rendered inoperative in the manner previously set forth, it being observed that in this form of the invention it will be necessary to have knife edges on the bottom of the blades 144.

Additional modulations by hammer shock waves may be produced upon the cyclic alternations of fluid and sonic energy by intermittently allowing the valve assembly ports to open and close, thereby intermittently applying fluid and sonic energy pressure from the formation for producing a flow, which upon being abruptly curtailed will produce a modulating hammer shock wave or waves in the outward flowing formation fluids and sonic energy and thereby in the interstices of the formation.

OPERATION OF THE DEVICE FOR INTRODUCING FLUIDS IN A FLOWING WELL

The third mode of operation is similar to that manner of operation immediately hereinbefore, but further contemplates the application of gases or fluids under pressure through the tubing 18 and past the valve assembly 28 for application to the formation through the ports 114 and 116 during the rotation of the device. These fluids upon pressuring the formation may be vented or released upon the registration of the succeeding quadrant of the sonic wave generating turbine rotor with the vanes 80, either producing thereby pulsating sonic wave pressures in the formation; operating as a vapor lift to assist in flowing formation fluids and sonic energy from the well bore through the tubing 16; or assisting the formation and sonic wave pressures in withdrawing fluid and sonic energy from the well bore. As in the preceding embodiments, the high frequency generator 32 may be selectively utilized or rendered idle; and the sonic wave modulating shock action may be selectively intermittently applied through manipulation of the valve assembly as previously set forth.

CONTROLLABLE METHODS FOR INCREASED RECOVERY FROM RESERVOIRS OF VARIABLE PERMEABILITIES AND/OR POROSITIES

When it is desired to controllably and selectively produce oil and gas from reservoirs that contain stratified or areal localized variations in permeability and/or porosity, or contain water and/or gas sections in permeable communication therewith, the sonic generator and pressured fluid and sonic wave radiating and distributing device 14 of FIGURES 1–11 is secured in place adjacent the face of the formation as previously explained in detail and used in a similar manner as heretofore taught except that controllable means are now placed at the surface of the well and interlocked with production from one or more production wells, whereby selectively and controllable production of oil and gas may be secured from substantially all of the productive portions of sections of the reservoir despite the described conditions in the earlier parts of this application wherein large portions of the oil and gas in the reservoir are often irrecoverable by heretofore known methods and practices.

After the device 14 is securely placed in operative condition in the well bore 12 as hereinbefore explained, the casing or tubing 16 is extended to and above the surface and connected with fluid supply system 196 (refer to FIGURE 19), which is connected through regulating valve 124 to a variable displacement pump 122 or sonic generator and pump as disclosed in my copending application, Ser. No. 665,995, which is driven by a variable speed motor 120.

Sonic energy and fluid return conduit or tubing 18 is connected at the surface through dual purpose control valve means 424 into fluid supply means 134, or if desired could go to other storage means or to waste. Fluid, usually in the liquid state, and which could include various additives, is supplied to pump and/or sonic generator 122 by supply line 138 from fluid supply means 134.

Production from the reservoir comes by way of line 402, through regulating valve 404, which may be a back pressure valve controlled electronically or by pressure responsive means through control line 430, into gas, oil and water separator 400, which separator may be of any type, but preferably is of a type that permits intermittent outflow of gas, oil and water through control valves 190, 412 and 408, respectively, as the proportionate build up of each within the separator operates buoyancy controlled interlocking floats which in turn or concurrently control the outflow of gas, oil or water.

Connected to the water discharge portion of separator 400 is line 406 which preferably leads to fluid supply means 134, so that any water production or the amount thereof exerts its influence of pressure and flow through control line 410 to master controller 128, which master controller may be of any of the well known electronic or pressure sensing types wherein any increase or decrease of signal strength from various control points may be selectively interlocked to produce a preselected increase or decrease of actuation of one or more control means at other points.

Connected to the gas portion of separator 400 is control and discharge valve 190, through which the gas may be conducted if desired to compressor 182 for compression to be added to the gas stored in pressure tank 180 for reinjection into the reservoir, or may be discharged to other lines for use or waste as desired. The pressure and flow of this gas from separator 400 is exerted upon control line 188 for its influence on the master controller 128.

Also connected to the master controller 128 for influence thereof, if desired, is control line 414 which is governed by the flow and pressure through oil production control valve 412 of separator 400.

In the fluid and/or sonic energy supply line 196 to the device 14 in the well bore, is control valve 164 with control line 166 therefrom for connection to and influence upon master controller 128, by the pressure and flow of fluid and/or sonic energy going down casing or tubing 16 to operate device 14 adjacent the face of the productive formation.

Located near the top of fluid supply 134, is a gas control and discharge valve 192, which preferably is float controlled and only operative upon a certain percentage of vapor being present in tank 134, from which a control line 194 goes to master controller 128, for the influence thereon of the flow and pressure from any gas being return along with the fluid and sonic energy from device 14 through tubing 18 and by line 198 into fluid supply means 134. Situated in this return line 198 is a dual purpose control and controlled valve 424, which has connected thereto a control line 428 which connects to liquid level and pressure sensing unit 136, which preferably is float controlled, and from there interconnects into control line 418 which by its transference to master controller 128 of the flow and pressure of fluid and sonic energy on return line 198 as well as the pressure and liquid level in supply means 134, has its influence thereon of the controlled valves or actuators. Preferably, from the vapor discharge and control valve 192 is a vapor return line 186 through which gas or vapor returned from the interstices of the formation by device 14 may be recompressed by compressor 182 and returned to compressed gas holder 180.

Coming from the master controller 128 are the various control lines for actuating the following: lines 422 to controlled means 126 for varying the speed of motor 120 and thus the frequency of pump or sonic generator 122; line 420 to controlled means 124 for controlling the volume and pressure of the fluid and/or the sonic energy going through regulating valve 124 on down the well bore through casing or tubing 16 to device 14; line 176 for controlling through controlled valve 174 the volume and pressure of gas, preferably in liquid form, going down conduit or pipe 172 to connect with the gas injection ports 170 on the rotating sonic generator 30 for selective injection along with the fluid and sonic energy into the interstices of the formation; and line 168 going to dual purpose valve 424 for controlling the volume and pressure allowed and controlled on the return line 198 from tubing 18 which returns fluid and sonic energy from device 14 adjacent the face of the formation in the well bore 12. The various uses of these control and controlled actuating means will be understood as the explanation proceeds and to afford a clearer understanding the methods of controlled use will be given of their use in conditions of rather extreme variations of normally used fluid and sonic energy drive flow through the reservoir from injection to production well.

As an example, where device 14 has been placed in an injection well where flood water and/or sonic waves have previously already channeled through highly permeable and porous sections of the reservoir and begins to cause mostly water production through line 402 into production separator 400, then sensing line 410 from the volume and pressure of water flowing through control valve 408, actuates proportionately within master controller 128, to cause by line 422' through motor controller 126, increases of speed of motor 120 thereby increasing the delivery and frequency of the pump and/or sonic generator 122. This causes, by line 420, controlled increases in the fluid pressure and/or pressure peaks of sonic waves delivered through regulating valve 124 to bottom hole device 14. Line 168 thence controls a reduction in pressure on the fluid and sonic energy return line 18 so that fluid and sonic energy proportionately at lower pressures may discharge at the surface through line 198 and is desired the fluid may be saved for reinjection in fluid supply means or tank 134.

The above reaction caused by the increase in water through separator 400 increases the frequency and pressure of the injections of pressured fluid and sonic energy going into the interstices of the face of the formation, so that proportionately the interstices of less permeability and porosity now retain more of the peaked pressures of fluid and sonic energy and the differential in the high pressure going into and the low pressure coming out of the formation accelerates proportionately the peaked pressures of fluid and sonic energy that began and maintains a retentive higher energy content driving force on the less permeable and/or porous sections of the reservoir wherein the more open sections merely provide channels for thrust and reversals of the pressurized fluid and sonic energy, with but a lessened, in comparison with the tighter sections, retention of a pressurized driving force.

In time, as the distance traversed by the pressured fluids and sonic energy is substantially causing a readjustment of oil production so that a desired bank of oil and gas is progressing by controllable, rather uniform, manner over the height and areal extent of the reservoir, interstitial resistance may build up and cause excessive energy requirements in reaching the bank of oil from the injection well. In that instance the pressure limit setting may be increased within the master controller 128 until the retentive pressure within the less permeable sections from the half wave peaked pressure fluid and sonic waves has reached the formation rupturing limits and thus the pulsing areal extent of the higher pressures achieved in these less permeable and/or porous sections will cause rather uniform multiple fracturing of these sections of the formation, where as the more permeable and/or porous sections although pressured more than before, will not reach the formation rupturing pressure limits and so proportionately these sections of the formation merely allow, as previously explained, a continued pulsing of advancing pressured oscillations to and fro within the reservoir.

When the last above occurs, there now enters a new unbalance wherein the formerly by-passed sections of the reservoir, by the progressive fracturing occurring and continuing substantially up to the face of the driven oil and gas bank, now offer less resistance to the cyclic alternations of half wave peaked pressures of fluid and sonic energy and the low pressure half wave rare factions, so that the bank of accumulated oil and gas in these most extreme tighter sections could advance beyond the areal extent in the reservoir of the rest of the oil and gas. This too rapid increase in a stratified formation of oil production from a sectional portion should normally show up as an out of proportion increase of production of oil from separator 400, which, by the flow and pressure past control valve 412 impresses on signal control line 414 a need within the master controller 128 for an increase in the pressure of the rarefactions produced within the interstices of the formation and thus the more permable sections proportionately would retain more of the pressure fluid and sonic energy and equilibrium of substantially uniform advance over all of the sections and areal extent of the reservoir would be caused to come into adjustment.

Actual field experience has proven that controllable and selectable sonic fracturing of formations has normally a very close pressure point at which sustained rupture occurs and continues over all of a given reservoir. This is quite different from conventional hydraulic fracturing wherein such difference in well to well as perforation compaction, variations of permeability or porosity, or the amount and type of drilling fluids that have entered the formation may cause wide differences of pressures needed to break down the formation, and that usually at a single point of entry at the position offering the last formation resistance, which could be a one phase gas or water section. In order that this progressive sonic fracturing of the reservoir by my methods as well as the fluid secondary recovery of oil and gas shown above be properly achieved, a multiple trace oscilloscope with recording oscillograph preferably is used as shown at 432 for the proper setting of the controls shown and used as above indicated in conjunction with the master controller 128, wherein the sonic pulse traces from at least the injection tubing or casing 16 and return and release tubing 18 are observed and/or recorded for comparative use and record.

In certain types of reservoirs, particularly those of oil undersaturated by gas or of a low gravity highly viscous crude, it is advantageous to include gases which the pressured fluid and sonic energy being injected into the interstices of the reservoir during the half wave peaked pressures generated cyclically by bottom hole device 14. This gas may be miscible or immiscible with the oil and gas and may be liquefiable under the injection pressures used on tubing or casing 16 going into device 14. In certain conditions it would be preferable that the gas injected by ports 170 be miscible with the oil of the formation so that it would mix with and stay in a substantially liquid state in the oil in the tighter sections under the peaked cyclic fluid and sonic pressures and in the more open sections revert to at least a partially vaporous state to assist in the return of fluid and sonic energy therefrom. Where progressive fracturing of the reservoir is done the gases may be an assisting force in selectively building up formation rupturing pressures in the tighter sections of the reservoir, particularly would this be so with the use of gases that would liquefy within the formation only at pressures approaching that of the sonic fracturing limits thereof, in that areal extent of accumulated build up of the myriads of pores would act collectively as means of thrusting apart of the binding or cementation of the usually sedimented formation materials.

Where water and/or gas sections are in permeable communication with the matrix of the formation that contains the oil and gas in solution, considerable loss of oil is occasioned wherein drive fluids seek out the usually more permeable water and/or gas sections. To prevent this as applied to an included water section, then where the drive fluid begins to come through the water production valve 408, from separator 400, FIGURE 19, then the same reaction as heretofore previously applied to a waterflooded, more open, section of the reservoir will be caused by master controller 128 to retain the pressured drive fluids and sonic energy in the less permeable oil and gas matrix of the formation.

Of particular assistance to the last above would be the use of gases controllably used with the device 14 that would be substantially immiscible with the water and miscible with the oil and gas. By setting the master controller 128 to cause controlled valve 174 to also controllably respond to the signal from control line 410, then gases, preferably liquefied, from reservoir 180 would be allowed to flow down piping 172 and from ports 170 of device 14 and co-mingle with the pressured fluid and sonic energy goin into the interstices of the formation as cyclic alternations of half wave peaked pressures. By proper interspersion of this gas substantially immiscible to the water, the water section may controllably and selectively be caused to become an area of substantially blocked fluids comprising the so called Jamin effect surface tension producing interstitial alternations of bubbles of gas with droplets of liquid within the capillaries through which the water must exert tremendous energy if it causes movement thereof. The oil, however, with the introduced gases going into solution on at least the half wave pressure portions of the cyclic alternations would be allowed to be produced by said cyclic alternations of pressured fluid and sonic energy.

In the instance where an included gas section allows the drive fluids to enter the usually relatively more permeable single state gas areas and thus cause principally all gas production from the production well into separator 400 (FIGURE 19) and later perhaps cause production of mostly the drive fluids, leaving the main matrix of the oil containing formation substantially unproduced, then the same controllable procedure is used with bottom hole device 14 as was done in regard to a water section. However, the control of the regulated frequencies and amplitudes of the cyclic alternations of peaked pressures and rarefactions would be governed by signaled data to master controller 128 from control line 188 under the influence of gas flow and pressure through control valve 190. One of the initial interlocking actions within master controller 128 is to place a controlled back pressure upon controlled production valve 404. In other words, the action within the gas section would be like the water section in that selectively and controllably an interstitial blocking of the formation would be produced by the proper cyclic and sonic alternation of injection and release of gases and liquids immiscible to each other, but not of the gas to the oil in the formation, so as to leave the single state gas mostly in position in place and produce the oil from the reservoir.

In that instance water and gas sections are both in permeable communication with the producing formation in the reservoir, control signals from either control line 188 or 410, or both, would selectively and controllably adjust through the master controller 128 the proper continuing treatment of pressured fluids and sonic energy for producing the desired oil from these types of reservoirs.

CONTROLLABLE AND SELECTIVE TREATING FORMATIONS OF VARIABLE PERMEABILITY

This invention has further application to the various treating processes, such as formation fracturing, acidizing, and the numerous combinations of treating processes wherein injected fluids are used to produce an increase of desired fluids or a decrease of undesired fluids from undergoing reservoirs that contain stratified or areal localizing of variations of permeability and/or porosity, or contain water and/or gas sections in permeable communication therewith. The sonic generator and pressured fluid and sonic wave radiating and distributing device 14 of FIGURES 1–11 is secured in place adjacent the face of the formation in a manner as previously explained in detail and used in a similar manner as herebefore taught. However, there is usually no interlocking of control signaling from the production wells. In treatment procedures, the control signaling for properly and successfully treating the less permeable and/or porous sections proportionately to a greater degree than the other sections occurs from signaled control information from the well or wells being treated. For clarity, reference is now made to FIGURE 20 which illustrates the use of the device 14 for the various treating processes. Where possible identical parts described in FIGURE 19 are carried into FIGURE 20.

The device 14 is securely placed in operative condition in the well bore 12 within the formation 10 as hereinbefore explained. The casing or tubing 16 is extended to the surface where it may be connected to treating fluid supply system 196, which is connected through regulating valve 124 to a variable displacement pump 122 or sonic generator and pump of the type as disclosed in my copending application, Ser. No. 665,995.

Sonic energy and fluid return conduit or tubing 18 may be connected at the surface through dual purpose control and controlled valve 424 into treating fluid supply means 134, or if desired could go to other storage means or to waste. Treating fluids, usually in the liquid state and which could be any of the formation fracturing or dissolving fluids with additive gelling, thickening or other types of agents, is supplied to pump or sonic generator 122 by supply line 138 fed through two way valve 434 from treating fluid supply means 134 by line 436. Also connected to two way valve 434 is line 446 which feeds from additional formation treating fluid supply means 44, which may contain formation fracture propping agents suspended in a suitable fluid carrier or it may contain so called gel breakers or other types of flushing agents used to thin or flush the formation after fracturing, acidizing or other formation treatments have been consummated.

In the pressured treating fluid and/or sonic energy supply line 196 to the device 14 in the well bore, and connected to master controller 128 which may be of any of the well known electronic or pressure sensing types wherein any increase or decrease of signal strength from various control points may be selectively interlocked to produce a preselected increase or decrease of actuation of one or more controlled means at other points, is control valve 164 with signal control line 166 therefrom for connection to and influence upon said master controller 128, by the pressure and flow of treating fluid and/or sonic energy going down casing or tubing 16 to operate device 14 adjacent the face of the productive formation.

Located near the top of treating fluid supply 134, is a gas control and discharge valve 192, which preferably is float controlled and only operative upon a certain percentage of vapor being present in tank 134, from which a control line 194 goes to master controller 128, for the influence thereon of the flow and pressure from any gas being returned along with fluid and sonic energy from device 14 through tubing 18 and by line 198 into treating fluid supply means 134. Situated in this return line 198 is a dual purpose control and controlled valve 424, which has connected thereto a signal control line 428 which connects to liquid level and pressure sensing unit 136, which preferably is float controlled, and from there interconnects into signal control line 418 which by its transference to master controller 128 of the flow and pressure of fluid and sonic energy on return line 198 as well as the pressure and liquid level in supply means 134, has its influence thereon of the controlled valves or actuators. Preferably, from the vapor discharge and control valve 192 is a vapor return line 186 through which gas or vapor returned from the interstices of the formation by device 14 may be recompressed by compressor 182 and returned to compressed gas holder or accumulator 180.

Coming from the master controller 128 are the various control lines for actuating the following; line 422 to control means 126 for varying the speed of motor 120 and thus the frequency of pump or sonic generator 122; line 420 to control means 124 for controlling the volume and pressure of the fluid and/or the sonic energy going through regulating valve 124 on down the well bore through casing of tubing 16 to device 14; line 176 for controlling through controlled valve 174 the volume and pressure of gas, preferably in liquid form, going down conduit or pipe 172 to connect with the gas injection ports 170 on the rotating sonic generator 30 for selective injection along with the treating fluids and sonic energy into the interstices of the formation; line 168 going to dual purpose valve 424 for controlling the volume and pressure allowed and controlled on the return line 198 from tubing 18 which returns treating fluid and sonic energy from device 14 adjacent the face of the formation in the well bore 12; and line 442 to pressure actuator 40 whereby controllably and selectively pressure may be applied to line 132 to selectively actuate by pressure the hammer valve assembly when it is desired to increase the amplitude and severeness of the peaked pressures of the half wave pressured fluid and sonic energy being cyclically injected into and released in alternations from the interstices of the formation. The various methods of using these control and controlled actuating means should be understood as the explanation proceeds to afford a clearer comprehension the methods of controlled use will be given of their use in conditions of somewhat extreme variations of permeability and/or porosity within reservoirs wherein conventional methods of treatment and even those wherein sonic waves have been included have usually had the adverse effect of either increasing production from sections already too permeable proportionately to the rest of the productive matrix or the causing of production of undesired fluids from the reservoir.

For example, the device 14 is placed in a well to fracture a formation in such a manner that substantially uniform production is had from both the less and more permeable sections, but where an attempt at conventional hydraulic fracturing even with the use of formation blocking agents has resulted in a single fracture back into the formation making open channel contact with a more permeable section. In operation, sensing signal control 164 indicates a large fracturing fluid and sonic energy loss. Control 424 along with liquid level control 136 senses low pressure and small flow of return fluid and sonic energy from device 14. Thence signaling lines 166 and 418 influence master controller 128 to cause, by way of control line 422 to motor controller 126, increases in speed of motor 120 thereby increasing the delivery and frequency of the pump and/or sonic generator 122. This causes, by line 420, controlled increases in the fluid pressure and/or pressure peaks of sonic waves delivered through regulating valve 124 to bottom hole device 14. Further, line 168 controls a reduction in pressure on the fluid and sonic energy return line 18 so that fluid and sonic energy proportionately at lower pressures may discharge at the surface through line 198 and if desired the fluid may be saved for reinjection in fluid supply means or tank 134.

This above reaction caused by a substantially uniform fracturing fluid and sonic energy loss into the face of the formation increases the frequency and pressure of the half wave injections of pressured fluid and sonic energy going into the interstices of the face of the formation, so that proportionately the interstices of less permeability and porosity now retain more of the peaked pressures of fluid and sonic energy and the differential in the high pressure going into and the low pressure coming out of the formation accelerates proportionately the half wave peaked pressures of fluid and sonic energy that began. In addition a retentive higher energy content rupturing force on the less permeable and/or porous sections of the reservoir wherein the substantially more open sections merely provide channels for thrusts and reversals of the pressured fluid and sonic energy, with but a lessened, in comparison with the lighter sections, retention of the pressured force tending to rupture and fracture the productive formation.

Actual field and laboratory testing of formation fracturing by sonic waves and pressured fluids has shown that by proper controlled build up of selective pressured sections of the formation by pressured fluids and sonic energy, the productive portions of the formation may be caused to rupture, split and fracture in a multiple or net work of entry points. It further appears that a fairly close preselected amount of fluid pressure and peaked pressure amplitude of sonic waves appears to be substantially able to be known as needed for rupture of most of the area of a particular reservoir. Whereas, in conventional formation fracturing most of the splitting force in the form of a hydraulic wedge is located at the face of the formation in the well bore, while sonic fracturing properly controlled and applied as taught herein, builds within the formation extensive areas of interstitial compressive build ups of pore spaces that when relieved by the initiation of fractures greatly extend not only the areal extend of the fracturing, but also creates interlocking cross fracturing in the vertical height of the desired productive formation, even to the extent of crossing shale breaks in the sand.

When considerable outward extension of the multiple fracturing is desired and previous sonic fracturing in a reservoir has given close ranges of the fluid and sonic wave pressures needed to cause the sudden usually abrupt rupture of the formation, then oscilloscope 432, FIGURE 20, is watched, or pressure limiting controls are set within master controller 128, and the formation rupturing limit is approached but not reached for a time sufficient to build up the pressure of the interstices of the formation near the well bore and after that lapse of treatment time control line 422 is actuated, which may be by a timer located within master controller 128, and the amplitude and severity of the peaked half waves of pressured fluid and sonic energy exiting from device 14 is greatly and sharply increased by the modulating hammer shock waves from the shock wave assembly to cause rupturing of the formation extending throughout the areal multiple build ups already existing in the less permeable sections of the formation. This modulating force of the hammer shock waves may be applied periodically over periods of time from the master controller 128, so as to allow time periods of rings of interstitial pressure build ups around the well bore approaching the formation rupturing limits and then the jump or break of the multiple fracturing of the formation would be controllably achieved by the modulating increased amplitude of sonic energy from the hammer valve assembly.

Of great assistance in the build up of the pores of the formation for fracturing is the controlled use of gases injected into the interstices of the formation along with the pressured fluid and sonic energy. By using gases of high vapor pressure miscible with the formation fluids or that are liquefiable at pressures approaching the formation rupturing limits, then their injected inclusion into the areas of the formation wherein areal extent of the fracturing is desired may be of significant assistance in the compressive thrusting apart of the formation when the multiple ruptures occur, either with or without the use of the modulating hammer shock waves. For the introduction of these gases, control line 194 from fluid return and supply means 134 may be controlling means within the master controller 128, from the influence of returned amounts of gas from the bottom hole device 14, to regulate controlled gas valve 174 by control line 176, to regulate controllably the amount of gas, preferably liquefied, that is introduced through gas supply line 172 to device 14 and used therein as previously explained. Recompression of cycled gas from device 14 may be done by compressor 182 through line 186 from fluid return and supply receivor 134.

It has been noticed repeatedly in the use of sonic waves to fracture formations that when a substantially complete major rupture or fracture occurs at the face of the formation, due perhaps to changing sonic wave length area in the well bore, this information of the major break is signaled at the rate or velocity of sound in and through the medium back to the surface. Then, a considerable time lag elapses before the mean fluid pressure drop occurring from the rupture or fracture at the bottom of the well bore adjacent the formation shows up likewise at the surface in fluid pressure loss. In conventional hydraulic fracturing where a propping agent is pumped in suitable suspension fluid into the split or fracture in the formation after the formation break or major pressure drop, then screen outs or sealing of the split at the face of the formation is done by the propping agents because of this time delay in knowledge of the formation rupture and time necessary to build up hydraulic pressures to again open the split or break and deposit the propping agents therein.

This invention utilizes the above signalling at the rate of sound in the fluid medium from the face of the formation of the rupture of the formation to not only hold open the fractures by not allowing the sudden drop in fluid pressure to follow up the fluid supply tubing or casing 16 to the surface and thus permit the healing of the rupture, by signaling and sensing controls and lines 164, 166 and 424, 168 instantly from the signal increasing the fluid and pressure supply on supply line 196 to tubing or casing 16 and thus down to device 14, but to also, by use of what could be a dash pot type of interlock, where a fast movement does not allow the dash pot to work and a gradual movement would disallow the interlock, then control line 438 to 3 way controlled valve 434 could be caused to switch fluid supply line 138 from the line 436 from the fracturing fluid supply means 134 to supply line 446 from auxiliary means 444. Where propping agents were to be used, then the propping agents suspended in a suitable carrier fluid could be supplied through pump or sonic generator 122 to device 14 at the face of the formation at the increased supply and pressure caused by the previously explained sonic signalling to the surface of the breaks occurring in the formation, without any substantial allowed healing of the formation splits or fractures and so be properly positioned in place to hold the fractures open for increased production of the formation fluids.

It is to be understood that in some types of formations wherein no propping agents are used, that auxiliary supply means 444 may contain a gel breaking, thinning or formation flushing fluid and this would follow the usually in some manner thickened or more viscous fracturing fluids into the breaks into the formation and thereby prepare the formation for production of connate fluids. In other instances where the gel breaker, thinning agent or flushing fluid was desired to be used following the introduction of the propping agents, then a float control (not shown) on auxiliary supply tank 444 could control another valve and receiver (not shown) holding the gel breaker, thinning agent or flushing fluid and allow this to be injected in sequence into the formation upon the exhausing of the fluid carrying the propping agents.

Substantially the same procedure may be applied to selective fracturing of reservoirs containing a water and/or gas section in permeable communication therewith as was applied to the earlier discussed fluid drives in these types of reservoirs, except that the control signaling to master controller 128 is done principally from the face of the formation or the supply and return means thereto and therefrom as explained in the above sonic fracturing wherein there are more open sections in communication with tighter sections within a productive reservoir. The same procedure or technique may be used as in the use of drive fluids in these reservoirs containing single phase water and/or gas sections in permeable association therewith as of using gases in conjunction with the cyclic alternations of injections of half wave peaked pressures of fluids and sonic energy and releases of half wave rarefied low pressures of fluids and sonic energy from the interstices of the formation and thereby controllably and selectively produce Jamin effect surface tension causing interspersion of multitudinous areas of bubbles of gas and droplets of liquid within these water and/or gas sections and thereby controllably fracture the less permeable oil and gas containing matrix of the reservoir, and the settings and controls are set so that formation rupturing limits are reached either with or without, as desired, the use of the amplitude modulations of the hammer shock waves.

Different types of formation dissolving fluids and acids may be used as shown above as the injected fluid or blended with the fracturing fluids and the formation rupturing limits may be reached or only approached as the dissolving fluids are allowed to react on the formation for opening production channels therethrough or increasing the size of breaks or fractures when the formation rupturing limits are exceeded. And the sequence of following the reaction of the spent acids with thinning agents or flushing fluids may be used without allowing the formation to attempt to heal as in the above explained reaction to sonic signals received at the surface of the initiation at the face of the formation of the occurrence of the rupturing. Further, it is contemplated that formation dissolving fluids may be the suspension fluid or medium for carrying the propping agents into the fractures in the formation and thus may attack the rest of the formation not being used as pillars of support for the non-dissolving propping agents and thus assist in the causing of channels for increased production from the reservoir. Gases may also be used with these various formation dissolving fluids as explained above in detail as to drive fluids and/or fracturing fluids as to these different types of productive reservoirs discussed herein.

EMBODIMENT OF FIGURES 12-14

Figure 12:
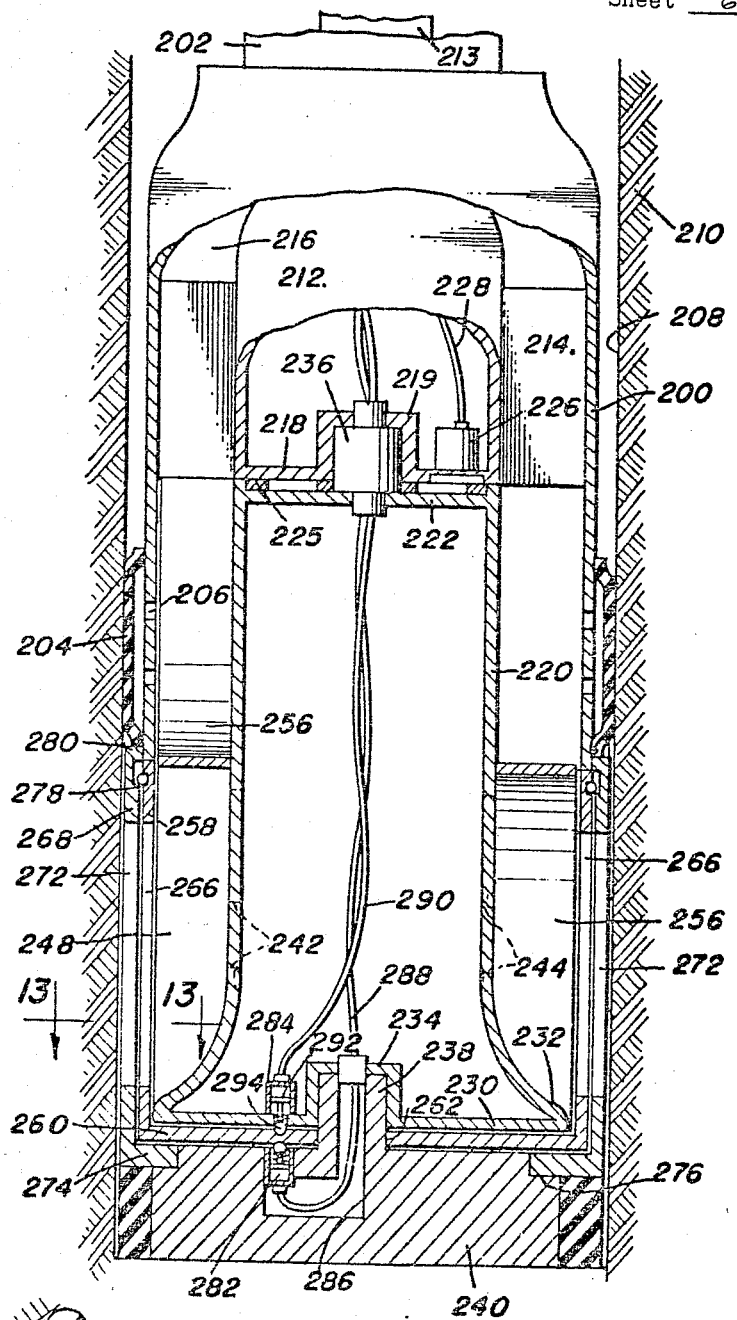
FIGURE 12 is a vertical sectional view through a modified apparatus.
Figure 13:
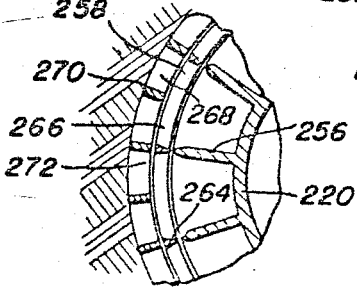
FIGURE 13 is a horizontal sectional detail view taken substantially upon the plane indicated by the section line 13—13 of FIGURE 12.
Figure 14:
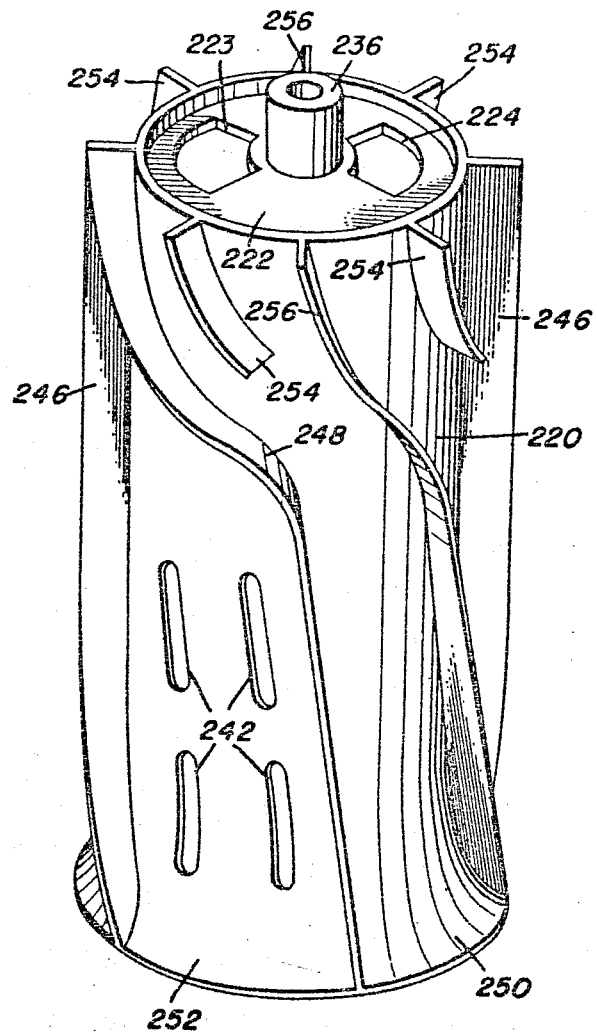
FIGURE 14 is a perspective view of the combined turbine rotor distributor, sonic wave generator and diffuser vane assembly of the embodiment of FIGURE 12.

FIGURES 12-14 illustrate another construction in accordance with the principles of this invention. In this modification, there is disclosed a hollow cylindrical body or casing 200 having its upper end reduced in diameter and detachably secured to the lower end of a tubing 202. Adjacent its lower portion and surrounding the same is a conventional packer 204 which is laterally expanded by a fluid medium under pressrue, flowing from the interior of the body 200 by the ports 206, into a tight anchoring engagement with the wall of a well bore 208 in a formation 210 which it is desired to treat with this apparatus.

Disposed centrally within the body 200 is an inner casing or body 212, having its upper end in communication with the interior of a tubing 213, to which it is detachably connected and which is received within the tubing 202. The inner body 212 constitutes part of a stationary diffuser vane assembly having a plurality of outwardly extending diffuser vanes or blades 214 of any desired character, which project across the annular passage 216 between the members 212 and 200 and are secured thereto. Diametrically extending across the bottom of the inner body is a bridge or spider 218 having a centrally disposed bearing housing 219.

As so far described, the above set forth structure is substantially identical with that of the embodiment of FIGURES 1-11. However, in this arrangement, the sonic wave generating turbine rotor and distributor and the lower pressured fluid and sonic wave radiating diffuser vane assembly have been replaced by a modified construction.

Referring now to FIGURES 12 and 14 it will be seen that this modified construction includes a cylindrical, hollow rotor body 220, preferably of the same diameter as the body 212 and disposed therebeneath in axial alignment therewith. At its upper end the body 220 has a top closure wall 222, recessed in the upper end of the body 220 and having oppositely disposed valve ports 223 and 224. A disk valve, indicated at 225 is rotatably received upon the recessed top wall 222, and constitutes therewith a valve assembly which is identical with that of the preceding embodiment. There is also provided a similar valve control member 226 supplied with an actuating means such as fluid under pressure by the conduit 228, these members being also identical with the members 130 and 132.

At its lower end, a wall 230 closes the outwardly flaring lower end 232 of the body 220, being provided with an upwardly dished, cup-shaped bearing housing 234. Rising axially from the top wall 222 is a cylindrical projection 236 comprising a bearing received in the bearing housing 219 whereby the upper end of the body 220 is mounted for rotation. The lower end is journaled by its bearing housing 234 being rotatable upon an upstanding hollow cylindrical bearing 238 projecting from the base 240.

Sets of vertically spaced ports 242, see FIGURE 14, and 244 on diametrically opposite sides of the body 220 provide communication with its interior. Upon its exterior the rotor body 220 has a blade or vane assembly of vanes, inclined in the manner shown in FIGURE 18, and which combines the structure and functions of the rotor vanes and the lower stationary fluid and sonic energy radiating diffuser vane of the previous embodiment.

The upper portion of the assembly of vanes 246, 248, 254 comprise the blades of the sonic wave generating turbine rotor and function to impart rotation to the rotor body 220 which now comprises the pressured fluid and sonic energy radiating device. These upper vane portions are disposed equally about the circumference of the rotor are equal in number to the vanes 214 of the upper diffuser assembly and are shaped in accordance with conventional practice in the design of turbine blades for having a rotative impulse imparted thereto by the passage of a fluid and/or sonic energy medium from the tubing 202, through the annular passage 216 and the diffuser vanes 214 and down about the exterior surface of the rotor 220.

Figure 18:
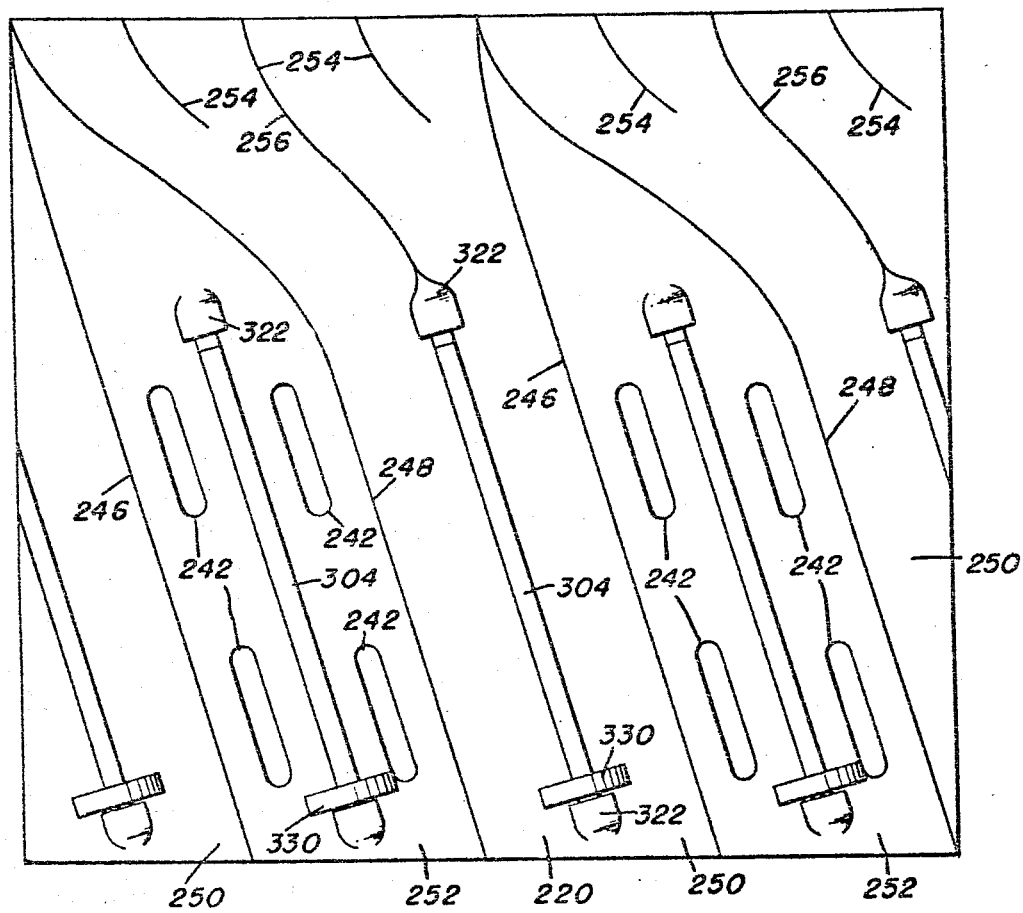
FIGURE 18 is a plan development of the circumference of the sonic generator turbine rotor, distributor and pressured fluid and sonic energy radiating diffuser assembly of the embodiment of FIGURE 15.

In the same manner as shown in the development view of FIGURE 18, and as shown in FIGURE 14, the vane arrangement is such that the fluid medium received between the upper ends of the vanes about the entire periphery of the rotor is segregated and discharged from between two oppositely disposed quadrants at the lower end thereof. The other two opposed quadrants at this bottom end are devoid of vanes in the form of FIGURES 12–14, receiving the returning or up-flowing fluid and sonic energy medium which is discharged therefrom into the interior of the rotor body by the ports 242 and 244, from whence it passes by the valve assembly 222, 223, 224 and 225 into the inner body 212 and its return tubing 213.

In order to effect the above functions, the vanes are arranged in the same general manner and function in the same general way as the turbine blades of the foregoing embodiment, and a detailed description is therefore deemed to be unnecessary. Briefly, each of the fluid and sonic energy return or fluid and sonic energy exhaust quadrants is bounded by a pair of vanes which extend the entire length of the rotor body, these being a relatively straight blade 246 and a curved vane 248 whose upper end merges with that of the blade 246 but whose lower end is spaced approximately 90° therefrom. This arrangement is also employed in the embodiment of FIGURES 15–18 being more clearly shown in the plan development view of FIGURE 18. These pairs of vanes divide the rotor body surface into four alternate supply or down flow quadrants 250 and return or up flow quadrants 252. In the supply quadrants are disposed intermediate vanes, some short as at 254 and other full length as at 256.

The lower portions of the vanes of the supply quadrants 250 perform the same functions as the vanes of the lower diffuser vane assembly 34 previously described, in that they deliver the fluid and sonic energy medium against the wall and thereby into the interstices of the formation, as the rotor revolves. This fluid and/or sonic energy under pressure, is intermittently applied by the alternate supply quadrants 250 as the rotor turns, thus imparting sonic wave pulsations and intermittent half wave peaked pressure fluid increases progressively to the formation. The peaked pressure and sonic wave increases are intermittently released as the succeeding return quadrants 252 effect a release or withdrawal of the fluid and sonic energy. Thus, high and low pressure fluid and sonic energy pulsations are simultaneously and intermittently applied to the interstices of the formation for treating the same in the manner set forth hereinbefore.

In some instances, the foregoing structure will be found sufficient for beneficially treating a formation to facilitate the increasing of the permeability thereof or the secondary recovery of oil therefrom. However, it is preferred to provide a high frequency wave generator which may be selectively placed into operation for increasing or providing additional high frequency pressure impulses or energy waves in the fluid and sonic energy medium. This generator serves the same general purposes of the generator 32 previously described. In this form of the invention, it consists of a cylindrical body 258 having a closed bottom wall 260 which is apertured at 262 for rotatable journalling on the bearing 238. The cylindrical wall has alternate vertically extending ribs or blades 264 (see FIGURE 13) and slots 266, the former having outwardly directed knife edges.

A cylindrical grating 268 closely surrounds the generator body 258, having alternate vertical ribs and slots 270 and 272 opposed to the ribs and slots of the generator and having an inturned bottom flange 274 resting on a shoulder 276 of the base 240. The grating is thus supported and held stationary by the base, a bearing assembly 278 being disposed between its upper end and the sonic generator body 258, while the upper end may be secured to the casing 200 as at 280.

The sonic generator may be selectively locked to the stationary base, whereupon it will be inoperative; or it may be locked to the rotor for rotation therewith, upon which it will be effective to produce high frequency waves in the fluid and sonic energy medium by the passage of its knife edged blades in close proximity to the grating ribs 270 as the fluid medium passes from the blades of the rotor 220 through the slots 266 and 272.

A pair of selectively operable locking members 282 and 284 are provided for engaging opposite sides of the bottom wall 260 to lock the same to the stationary base 240 or the revolving bottom wall 230 of the rotor 220. A cavity 286 in the base 240 communicates with the tubular bearing 238 and with the underside of the wall 260, and a fluid conducting conduit 288 extends into the cavity and is operatively connected to the locking member 282 for actuating the latter. A similar conduit 290 communicates with the locking member 284 which is mounted within the rotor body 220 upon the bottom wall 230 thereof. The cables extend through the interior of the body 220 and through the tubular bearing 236 into the body 212 and from thence up the conduit 213 to the surface of the well bore when they are connected to any suitable pressure source and control means, not shown.

The locking devices are of identical construction and include fluid pressure cylinders having plungers 292 which actuate locking balls 294. The latter are engageable, under the action of the fluid actuated locking plungers in detent recesses in the top and bottom sides of the bottom wall 260 of the generator body.

From the foregoing, it is believed that the construction and operation of this form of the invention will be readily necessary.

EMBODIMENT OF FIGURES 15–18

Shown in FIGURES 15–18 is a still further modified construction in accordance with the same general principles as those of FIGURES 1–11, and which also is similar to the arrangement of FIGURES 12–14. A formation 300, having a well bore 302 therein and in which is disposed a modified construction of apparatus for treating the formation is illustrated. The upper portion of this device is identical with that shown in FIGURES 12 and 14, and therefore has been omitted from the drawings.

As in the preceding modification, the cylindrical rotor body 220 is provided as shown in FIGURE 18, with a plurality of the inclined turbine rotor vanes 246, 248, 254 and 256. In addition to these fixedly mounted vanes, however, the present embodiment is provided with oppositely disposed pairs of pivoted blades 304 having substantially knife-shaped edges 306. The blades 304 are journaled as by trunnions 308 at their lower ends in suitable bearing recesses 310 disposed upon the bottom wall 312, which latter forms a closure for the lower end of the body 220 of the sonic wave generating turbine rotor and rotary pressured fluid and sonic wave distributor and radiator combination. The bottom wall also carrier a downwardly projecting axial bearing trunnion 314 which is rotatably received in a bearing recess 316 in the supporting base 318 which may be identical with the base 38.

At their upper ends, the pivoted vanes 304 are provided with axially upwardly extending pintles 320 which are received in suitable journal bearings formed in projecting lugs or bosses 322 extending from the rotor body 220. If desired, there may be provided a foraminous or reticulated screen 324 which may be interposed between the rotor and the wall of the well bore. Alternatively, this screen may be omitted.

Referring now more particularly to the development plan view of FIGURE 18 it will be seen that the exterior cylindrical surface of the rotor 220 is divided into fluid supply and fluid return quadrants 250 and 252 respectively, by the above mentioned vanes and as set forth in the preceding embodiment. The function of the vanes 246, 248, 254 and 256 is identical with that set forth in connection with the preceding embodiment and therefore is not repeated here. It is also to be understood that the same check valve assembly previously referred to in the two preceding modifications may also be provided, if desired, to impart peaked pressure amplitude increasing hammer shock waves modulating to the fluid and sonic waves, and therefore is not repeated here.

The pivoting vanes 304 are preferably, as shown in FIGURE 18 disposed at an inclined angle, the angular disposition serving to direct sonic wave pulsations upwardly or downwardly, depending upon the nature of the inclination, as set forth hereinafter.

In accordance with this embodiment, the pivoted vanes 304 may be selectively locked in their radial position, whereupon they will function in the same manner as the fixed vanes. Alternatively, they may be released for rotation such rotation being induced by their passage through the medium during the revolution of the rotor body 220, and during their rotation about their axles 308 and 320 the knife edges 306 of the blades will generate high frequency vibrations in the fluid and sonic energy medium. It will be observed that adjacent each of the pivoted vanes 304, the surface of the rotor body 220 is curved or recessed inwardly, as shown at 374. This arrangement permits a relative radially inward flow of the fluid surrounding the rotor across and against the projecting extremities of the vanes 304 to thereby rotate the latter when the vanes are unlocked. It is the passage of the fluid and sonic energy across the blade edges, periodically interrupted by the rotation of the blades which initiates the high frequency vibratoin modulating the sonic waves in the fluid medium.

Figure 15:
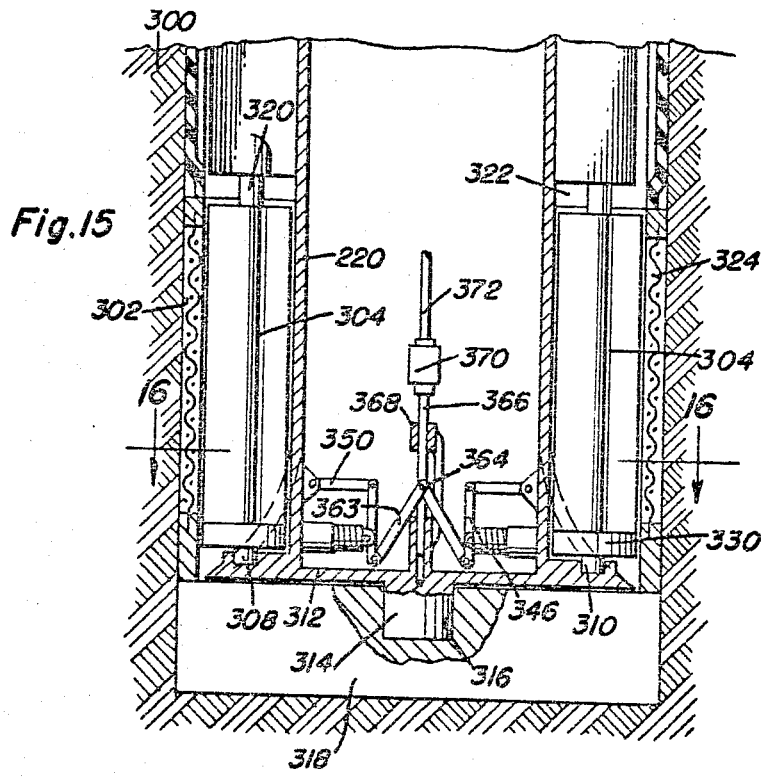
FIGURE 15 is a fragmentary in vertical section of another modified construction of the rotor, sonic generator, distributor and fluid and sonic wave radiating diffuser assembly.
Figure 16:
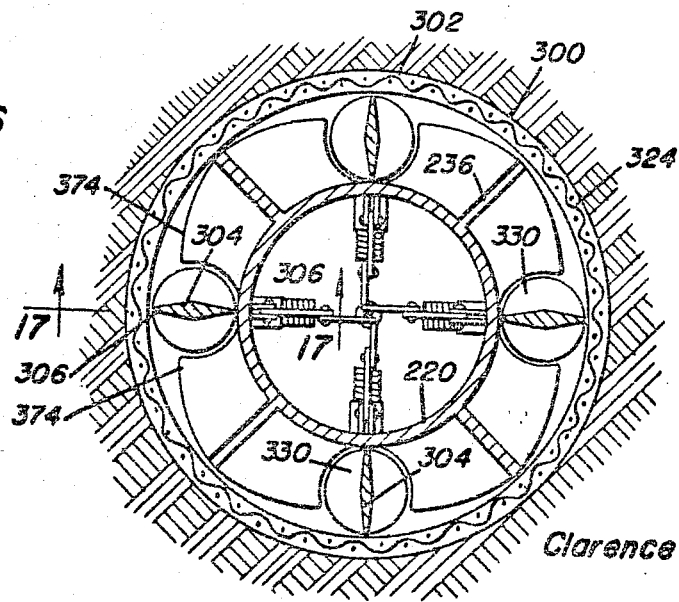
FIGURE 16 is a horizontal sectional view taken substantially upon the plane indicated by section line 16—16 of FIGURE 15.
Figure 17:
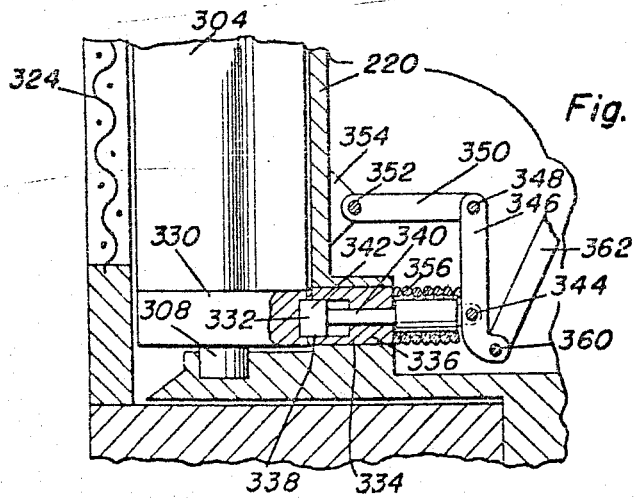
FIGURE 17 is an enlarged detail of a locking device forming part of the embodiment of FIGURE 15.

It should be noted that the pivoted vanes are mounted in both the supply and return quadrants 250 and 252. In the latter quadrant they may constitute the lower portion or a continuation of the blade 256. In order to effect this selective locking and releasing action, the mechanism shown in FIGURES 14, 15 and 17 is provided.

Adjacent their lower ends each of the pivoting vanes is provided with a circular disk 330 which is provided with a radially disposed depression or recess 332 in the periphery of the same. Disposed within the interior of the body 220 is a bore 334 adjacent each of the pivoted vanes, and a sleeve 336 is slidable in this bore, the sleeve having a face 338 contoured to slidably engage the periphery of the disk 330 and constitute a friction brake therefor. Reciprocable within the sleeve is a plunger 340 having at its inner end a rounded projection or detent 342 adapted to engage and cooperate with the recess 332. The plunger is pivoted at 344 to the midportion of a lever 346 having one end fulcrumed as at 348 to a link 350 which is hinged at 352 to a suitable lug 354 upon the wall of the body 220. Surrounding the plunger and abutting against the sleeve 336 and the lever 346 is a compression spring 356 which simultaneously engages the lever and the plunger away from the locking disk 330 of the pivoted vane; and urges the braking sleeve 336 towards frictional engagement with the disk.

The arrangement is such that when the lever 356 is swung towards the locking disk, it will cause the spring to press the locking sleeve 336 into braking engagement with the disk to frictionally grip and retard rotation of the same, and upon further movement will cause the locking projection 342 to engage in locking recess 332 of the locking disk. Thus, the pivoted vanes will be held positively against rotation; and if rotating, they will be frictionally slowed down by the braking sleeve before they are positively stopped and locked by the plunger and its locking projection.

All of the pivoted vanes may be selectively locked and unlocked simultaneously. For this purpose, each of the locking levers 346 is pivotally connected at 360 to a connecting link 363. As shown in FIGURE 14, each of these last mentioned links is in turn pivoted as by pivot pins 364 to a control rod 366 which is slidably received in guides 368 for vertical reciprocation. Any suitable actuating means such as a fluid pressure responsive device 370, supplied with fluid pressure as by a conduit 372 may be provided to cause reciprocation of the control rod 366. When the latter is elevated, the levers will be moved into unlocking position, while when the rod is lowered, the locking action will occur as previously set forth. Alternatively, each pair of the oppositely disposed locking members may be controlled independently.

The operation and functioning of this embodiment is similar to that of FIGURES 12–14 and will be readily apparent from the preceding description.

What is claimed:
1. A method of recovering oil and gas from less permeable portions of a productive reservoir wherein there are permeability variations in the vertical height thereof, comprising the steps of:
  utilizing a first means for placing in communication with the face of said formation controllable cyclic alternations of peaked pressure half wave cycles of a fluid medium and sonic waves for injection into the interstices of said formation; and
  utilizing a second means for cyclically withdrawing while in communication with the formation controllable amounts of fluid medium and reflected sonic energy from said formation only during half wave rarefied low pressure portions of said cyclic alternations;
  allowing retention of peaked pressures of fluid medium and sonic energy in the less permeable interstices of said formation by said controllable withdrawals of fluid medium and reflected sonic energy from the formation during the said half wave low pressure portions of said cyclic alternations.

2. The method of claim 1, including abruptly and intermittently interrupting the controlled release of said fluid medium and reflected sonic energy,
  whereby to assist in the controllable retention of said fluid medium and sonic energy in said less permeable interstices of the formation.

3. The method of claim 1 wherein said fluid medium is a drive medium in an injection well and said retention of peaked pressures of fluid medium and sonic energy in less permeable interstices of said formation assists in the production of formation fluids at production wells from said less permeable interstices of said formation.

4. The method of claim 1 wherein said first means for injecting a fluid medium and sonic waves is placed in a well bore in communication with said formation, and
wherein control of said cyclic alternations of said first means and withdrawal of fluid medium and reflected sonic wave energy by said second means is from the surface and through the fluid medium.

5. The method of claim 4 wherein said fluid medium is a drive medium in an injection well and said retention of peaked pressures of fluid medium and sonic energy in less permeable interstices of said formation assist in the production of formation fluids at production wells from said less permeable interstices of said formation.

6. The method of claim 1 wherein said fluid medium contains an acidizing agent that is controllably retained in the less permeable interstices of said formation for control of acidizing or dissolving of the formation thereof.

7. The method of claim 6, including abruptly and intermittently interrupting the controlled release of said fluid medium containing an acidizing agent and sonic energy,
whereby to assist in the controllable dissolving action of the acidizing agent upon said less permeable interstices of the formation.

8. The method of claim 3 wherein said first means for injecting a fluid medium containing an acidizing agent and sonic waves is placed in a well bore in communication with said formation, and
wherein control of said cyclic alternations of said first means and withdrawal of fluid medium containing an acidizing agent and reflected sonic wave energy by said second means is from the surface and through the fluid medium.

9. The method of claim 1 wherein said fluid medium contains a gas, that assists in the retention of the fluid medium and sonic energy in said less permeable interstices of the formation.

10. A method of recovering oil and gas from less permeable portions of a productive reservoir wherein there are permeability variations in the vertical height thereof, comprising the steps of: utilizing a first means for placing in communication with the face of said formation controllable cyclic alternations of peaked pressure half wave cycles of a fluid medium and sonic waves for injection into the interstices of said formation; and utilizing a second means for cyclically withdrawing while in communication with the formation controllable amounts of fluid medium and reflected sonic energy from said formation during half wave rarefied low pressure portions of said cyclic alternations; allowing retention of peaked pressures of fluid medium and sonic energy in the less permeable interstices of said formation by said controllable withdrawals of fluid medium and reflected sonic energy from the formation during the said half wave low pressure portions of said cyclic alternations, said fluid medium containing a gas, that assists in the retention of the fluid medium and sonic energy in said less permeable interstices of the formation, said gas being a liquefiable petroleum gas or other volatile gas such as carbon dioxide or nitrogen that upon injection into the interstices of said formation by said first means becomes substantially a one phase fluid with the fluids of the formation or of said fluid medium, and becomes controllably vaporous at least in part during the controllable withdrawals by said second means, thus providing means for allowing controllable retention of the fluid medium and sonic energy in the less permeable interstices of said formation and the use of said vaporous gas for a gas lift effect from said formation of said fluid medium or formation fluids.

11. The method of claim 6 wherein said fluid medium contains an acidizing agent and said vaporous gas lift effect assists in returning said agent from the formation along with formation debris.

12. The method of claim 6 wherein said gas containing fluid medium is a drive medium in an injection well and said retention of peaked pressures of fluid medium and sonic energy in less permeable interstices of said formation assist in the production of formation fluids at production wells from said less permeable interstices of said formation.

13. The method of claim 6 wherein said first means for injecting a fluid medium and sonic waves is placed in a well bore in communication with said formation, and
wherein control of said cyclic alternations of said first means and withdrawal of fluid medium and reflected sonic wave by said second means is from the surface and through the fluid medium.

14. The method of claim 13 wherein said fluid medium is a drive medium in an injection well and said retention of peaked pressures of fluid medium and sonic energy in less permeable interstices of said formation assist in the production of formation fluids at production wells from said less permeable interstices of said formation.

15. A method of recovering oil and gas from less permeable portions of a productive reservoir wherein there are permeability variations in the vertical height thereof, comprising the steps of: utilizing a first means for placing in communication with the face of said formation controllable cyclic alternations of peaked pressure half wave cycles of a fluid medium and sonic waves for injection into the interstices of said formation; and utilizing a second means for cyclically withdrawing while in communication with the formation controllable amounts of fluid medium and reflected sonic energy from said formation during half wave rarefied low pressure portions of said cyclic alternations; allowing retention of peaked pressures of fluid medium and sonic energy in the less permeable interstices of said formation by said controllable withdrawals of fluid medium and reflected sonic energy from the formation during the said half wave low pressure portions of said cyclic alternations, the controllable peaked pressures of the half wave cycles of the fluid medium or of the sonic wave energy being increased to an extent to fracture said less permeable interstices of said formation more fully than the more permeable interstices of said formation, by means of said retention of peaked pressures and sonic energy in substantially said less permeable interstices of said formation.

16. The method of claim 15, including abruptly and intermittently interrupting the controlled release of said fluid medium and reflected sonic energy,
whereby to assist in the controlled fracture of said less permeable interstices to a greater extent than the more permeable interstices of said formation.

17. The method of claim 15 wherein said fluid medium contains an acidizing agent that assists in dissolving said less permeable interstices to a greater extent than the more permeable interstices of said formation while said formation is being fractured.

18. The method of claim 15 wherein said fluid medium contains a volatile gas such as carbon dioxide, nitrogen, or petroleum gases that becomes substantially a one phase fluid with the fluid medium or the formation fluids during the increase of the peaked pressures or of the sonic wave energy that produces fracturing of said formation, and
utilizing the expansion of the gas into a substantially two phase fluid medium during the controllable release of the fluid medium and sonic energy from said formation as a gas lift effect from said formation of the fluid medium and formation debris after said fracture of said formation.

19. The method of claim 18 wherein said gas containing fluid medium also contains a formation acidizing agent that dissolves controlled portions of said formation while it is being fractured and said gas lift effect after the formation is fractured also returns said agent from said formation along with the fluid medium and said formation debris.

20. The method of claim 18, including abruptly and intermittently interrupting the controlled release of said gas containing fluid medium and reflected sonic energy, whereby the gas contained in the fluid medium assists in the controlled fracture of said less permeable interstices of said formation to a substantially greater extent than the more permeable interstices of said formation.

21. The method of claim 20 wherein said gas containing fluid medium also contains a formation acidizing agent that dissolves controlled portions of said formation while it is being fractured and said gas lift effect after the formation is fractured also returns said agent from said formation along with the fluid medium and said formation debris.

22. The method of claim 15 wherein said first means for injecting a fluid medium and sonic waves is placed in a well bore in communication with said formation, and wherein said controlled peaked pressures of the half wave cycles or of the sonic energy is increased to an extent to fracture said less permeable interstices of said formation substantilaly more fully than the more permeable interstices of said formation, also whereas control of said cyclic alternations of said first means and withdrawal of fluid medium and reflected sonic wave energy by said second means that assists in said controllable fracture of said formation is from the surface and through the fluid medium.

23. The method of claim 22 wherein said fluid medium contains an acidizing agent that assists in dissolving said less permeable interstices to a greater extent than the more permeable interstices of said formation while said formation is being fractured.

24. The method of claim 22, including abruptly and intermittently interrupting the controlled release of said fluid medium and reflected sonic energy, whereby to assist in the controlled fracture of said less permeable interstices to a greater extent than the more permeable interstices of said formation.

25. The method of claim 24 wherein said fluid medium contains a formation acidizing agent that assists in dissolving said less permeable interstices to a greater extent than the more permeable interstices of said formation while said formation is being fractured.

26. The method of claim 22 wherein said fluid medium contains a volatile gas such as carbon dioxide, nitrogen, or petroleum gases that becomes substantially a one phase fluid with the fluid medium or the formation fluids during the increase of the peaked pressures or of the sonic wave energy that produces fracturing of said formation, and
utilizing the expansion of the gas into a substantially two phase fluid medium during the controllable release of the fluid medium and sonic energy from said formation as a gas lift effect from said formation of the fluid medium and formation debris after said fracture of said formation.

27. The method of claim 26 wherein said gas containing fluid medium also contains a formation acidizing agent that dissolves controlled portions of said formation while it is being fractured and said gas lift effect after the formation is fractured also returns said agent from said formation along with the fluid medium and said formation debris.

28. The method of claim 26, including abruptly and intermittently interrupting the controlled release of said gas containing fluid medium and reflected sonic energy, whereby the gas contained in the fluid medium assists in the controlled fracture of said less permeable interstices of said formation to a substantially greater extent than the more permeable interstices of said formation.

29. The method of claim 28 wherein said gas containing fluid medium also contains a formation acidizing agent that dissolves controlled portions of said formation while it is being fractured and said gas lift effect after the formation is fractured also returns said agent from said formation along with the fluid medium and said formation debris.

30. The method of claim 15 wherein said fluid medium is a drive medium in an injection well and said controlled increase of peaked pressures of the fluid medium or of the sonic wave energy to an extent to cause fracture of said formation is controlled by an increase of pressure at the injection well or of unwanted amounts of water or of gas at production wells to which said drive medium is driving interstitial fluids of the formation.

31. The method of claim 30 wherein said control of increase of peaked pressures of the fluid medium or of the sonic wave energy is controlled by the production of unwanted water or gas at said production wells.

32. The method of claim 30, including abruptly and intermittently interrupting the conrtolled release of said fluid medium and reflected sonic wave energy, whereby to assist in the controlled fracture of said less permeable interstices to a greater extent than the more permeable interstices of said formation.

33. The method of claim 30 wherein said first means for injecting a fluid medium and sonic waves is placed in a well bore in communication with said formation, and wherein control of said cyclic alternations of said first means and withdrawal of fluid medium and reflected sonic wave energy by said second means is from the surface and through the fluid medium.

34. The method of claim 33, including abruptly and intermittently interrupting the controlled release of said fluid medium and said reflected sonic wave energy, whereby to assist in the controlled fracture of said less permeable interstices to a greater extent than the more permeable interstices of said formation.

35. The method of claim 30 wherein said fluid medium contains a volatile gas such as carbon dioxide, nitrogen, or petroleum gases that becomes substantially a one phase fluid with the fluid medium or the formation fluids in at least the less permeable interstices of said formation during the increase of the peaked fluid medium pressures or of the sonic wave energy that produces controlled fracturing of said formation, and
utilizing the expansion of the gas into a substantially two phase fluid medium in at least the more permeable interstices of said formation during the controllable release of the fluid medium from said formation as an interstitial induced Jamin action effect or controlled formation blocking effect in the more permeable interstices of said formation,
whereby to assist in controlling a substantially uniform driving of the formation fluids to said production wells by said drive fluids.

36. The method of claim 35 wherein said gas containing fluid drive medium is controlled as to its gas containing content by the unwanted production of water or gas at said production wells to which said drive medium is driving interstitial fluids of the formation.

37. The method of claim 35, including abruptly and intermittently interrupting the controlled release of said gas containing fluid medium and sonic wave energy, whereby to assist in the controlled fracture of said less permeable interstices to a greater extent than the more permeable interstices of said formation.

38. The method of claim 35 wherein said first means for injecting a gas containing fluid medium and sonic waves is placed in a well bore in communication with said formation, and
wherein control of said cyclic alternations by said first means and withdrawal of said gas containing fluid medium and reflected sonic wave energy by said second means is from the surface and through the fluid medium.

39. The method of claim 38, including abruptly and intermittently interrupting the controlled release of said gas containing fluid medium and reflected sonic wave energy,
whereby to assist in the controlled fracture of said less permeable interstices to a greater extent than the more permeable interstices of said formation.

40. In a method of recovering fluids from a subsurface reservoir formation of varying permeability by injecting a fluid medium into the formation, the steps of: cyclically compressing the fluid medium to peak pressures and simultaneously inducing a sonic energy wave having compression cycle phases coincident with said peak pressures and rarefaction cycle phases; exposing the formation to the fluid medium during said compression cycle phases of the sonic energy wave to cause said injection of the fluid medium under said peak pressures and radiation of sonic energy into the formation; and cyclically conducting a controlled outflow of fluid medium from the formation only during the rarefraction cyclic phases of the sonic energy wave to withdraw reflected sonic enrgy with the controlled outflow and correspondingly modulate the rarefaction cycle phases of the induced sonic energy wave.

41. The method of claim 40 wherein said fluid medium during injection into interstices of said formation becomes a one phase fluid with the fluids of the formation and during said controlled outflow becomes volatile to permit retention of some of the fluid medium in less permeable interstices of the formation.

References Cited
UNITED STATES PATENTS

| | | | |
|---|---|---|---|
| 2,670,801 | 3/1954 | Sherborne | 166—177 X |
| 2,918,126 | 12/1959 | Bodine | 166—42 |
| 3,016,093 | 1/1962 | Bodine | 166—43 |
| 3,016,095 | 1/1962 | Bodine | 166—177 |
| 3,323,592 | 6/1957 | Brandon | 166—42 |

DAVID H. BROWN, *Primary Examiner.*

U.S. Cl. X.R.

166—45, 177

UNITED STATES PATENT OFFICE
CERTIFICATE OF CORRECTION

Patent No. 3,422,894

January 21, 1969

Clarence W. Brandon

It is certified that error appears in the above identified patent and that said Letters Patent are hereby corrected as shown below:

Column 33, line 28, the claim reference numeral "3" should read -- 6 --; same column 33, line 74 and column 34, lines 3 and 10, the claim reference numeral "6", each occurrence, should read -- 10 --.

Signed and sealed this 24th day of March 1970.

(SEAL)
Attest:

Edward M. Fletcher, Jr.
Attesting Officer

WILLIAM E. SCHUYLER, JR.
Commissioner of Patents